(12) United States Patent
Takano et al.

(10) Patent No.: US 10,140,112 B2
(45) Date of Patent: Nov. 27, 2018

(54) UPDATE MANAGEMENT SYSTEM AND UPDATE MANAGEMENT METHOD

(71) Applicant: NTT DOCOMO, INC., Chiyoda-ku (JP)

(72) Inventors: Yusuke Takano, Chiyoda-ku (JP);
Takashi Shimizu, Chiyoda-ku (JP);
Motoshi Tamura, Chiyoda-ku (JP);
Hidenori Asaba, Chiyoda-ku (JP);
Takeo Yamasaki, Chiyoda-ku (JP);
Masaaki Kosugi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 10 days.

(21) Appl. No.: 15/121,427

(22) PCT Filed: Feb. 13, 2015

(86) PCT No.: PCT/JP2015/054023
§ 371 (c)(1),
(2) Date: Aug. 25, 2016

(87) PCT Pub. No.: WO2015/146355
PCT Pub. Date: Oct. 1, 2015

(65) Prior Publication Data
US 2016/0364226 A1    Dec. 15, 2016

(30) Foreign Application Priority Data

Mar. 28, 2014   (JP) ................................. 2014-069216

(51) Int. Cl.
*G06F 8/65* (2018.01)
*G06F 9/455* (2018.01)
*G06F 9/50* (2006.01)

(52) U.S. Cl.
CPC ............ *G06F 8/65* (2013.01); *G06F 9/45558* (2013.01); *G06F 9/5077* (2013.01); *G06F 2009/4557* (2013.01); *G06F 2009/45562* (2013.01)

(58) Field of Classification Search
CPC ...... G06F 8/65; G06F 9/45558; G06F 9/5077; G06F 2009/45562; G06F 2009/4557
See application file for complete search history.

(56) References Cited

U.S. PATENT DOCUMENTS

| | | | |
|---|---|---|---|
| 8,359,594 B1 * | 1/2013 | Davidson | G06F 9/5077 709/218 |
| 9,244,674 B2 * | 1/2016 | Waterman | G06F 8/65 |

(Continued)

FOREIGN PATENT DOCUMENTS

JP    11-15647 A    1/1999

OTHER PUBLICATIONS

Hines et al. "Post-Copy Based Live Virtual Machine Migration Using Adaptive Pre-Paging and Dynamic Self-Ballooning," 2009, Proceedings of the 2009 ACM SIGPLAN/SIGOPS international conference on Virtual execution environments, pp. 51-60.*

(Continued)

*Primary Examiner* — Thuy Dao
*Assistant Examiner* — Stephen D Berman
(74) *Attorney, Agent, or Firm* — Oblon, McClelland, Maier & Neustadt, L.L.P.

(57) ABSTRACT

In an update management system including a plurality of servers executing a communication service, a server not connected to a network in which a new version of an application is operated is generated in parallel with a server in which an old version of the application is operated, and old and new correspondence data between an old version server and a new version server is generated and used to (Continued)

execute switching from the old version server to the new version server in a flow on the network and to execute switching-back to the old version server by referring to the old and new correspondence data at the time of occurrence of fault in a new version.

8 Claims, 19 Drawing Sheets

(56) References Cited

U.S. PATENT DOCUMENTS

| | | | | |
|---|---|---|---|---|
| 2007/0204265 | A1* | 8/2007 | Oshins | G06F 9/4856 718/1 |
| 2008/0222633 | A1 | 9/2008 | Kami | |
| 2010/0115512 | A1* | 5/2010 | Sakai | G06F 8/65 718/1 |
| 2010/0332637 | A1* | 12/2010 | Doi | G06F 9/45558 709/223 |
| 2012/0072909 | A1* | 3/2012 | Malik | H04L 12/4641 718/1 |
| 2012/0084445 | A1* | 4/2012 | Brock | G06F 9/5077 709/226 |
| 2012/0096459 | A1* | 4/2012 | Miyazaki | G06F 9/45558 718/1 |
| 2013/0132945 | A1* | 5/2013 | Anderson | G06F 8/65 718/1 |
| 2013/0227551 | A1* | 8/2013 | Tsirkin | G06F 9/45558 718/1 |
| 2013/0254765 | A1* | 9/2013 | Shinohara | G06F 8/65 718/1 |
| 2014/0237464 | A1* | 8/2014 | Waterman | G06F 8/65 717/172 |
| 2014/0359617 | A1* | 12/2014 | Fontignie | G06F 8/65 718/1 |
| 2015/0100958 | A1* | 4/2015 | Banavalikar | G06F 9/45558 718/1 |

OTHER PUBLICATIONS

Christopher Clark et al., "Live migration of virtual machines," 2005, Proceedings of the 2nd conference on Symposium on Networked Systems Design & Implementation, vol. 2, pp. 273-286, downloaded from the Internet at <url>:https://dl.acm.org/citation.cfm?id=1251223. (Year: 2005).*

Constantine Sapuntzakis et al., "Optimizing the migration of virtual computers," 2002, Proceedings of the 5th Symposium on Operating Systems Design and Implementation, vol. 36 Issue SI, pp. 377-390, downloaded from the Internet at <url>:https://dl.acm.org/citation.cfm?id=844163 (Year: 2002).*

Yingwei Luo et al., "Live and Incremental Whole-System Migration of Virtual Machines Using Block-Bitmap," 2008, IEEE International Conference on Cluster Computing, pp. 99-106, downloaded from the Internet at <url>:https://ieeexplore.ieee.org/document/4663760/?source=IQplus. (Year: 2008).*

Extended European Search Report dated Mar. 6, 2017 in Patent Application No. 15769695.6.

International Search Report dated Apr. 7, 2015 in PCT/JP2015/054023 filed Feb. 13, 2015.

International Preliminary Report on Patentability and English translation of the Written Opinion dated Oct. 13, 2016 in PCT/JP2015/054023.

Office Action dated Sep. 4, 2017 in European Patent Application No. 15769695.6.

* cited by examiner

Fig.4

(a) Old and new correspondence data (Acquire necessary information from VNFM in response to update notification response. Deleted at time of update settlement or NW switching-back)

| Receipt number | New VNF number | Old VNF number | VNF type | Version | NW configuration | State |
|---|---|---|---|---|---|---|
| 1 | VNF10_2 | VNF10_1 | VNF10 | 1.5 | Distribution is required | Updating |
| 2 | VNF20_3 | VNF20_2 | VNF20 | 2.0 | Distribution is not required | Monitoring |

(b) VNF configuration data (Configuration information is held only when orchestrator instructs VIM)

| VNF number | VNF type | Version | Configuration information |
|---|---|---|---|
| VNF10_1 | VNF10 | 1.0 | VNFC100_0,VNFC100_1,VNFC101_0 |
| VNF10_2 | VNF10 | 1.5 | VNFC100_2,VNFC100_3, VNFC101_1 |
| VNF20_3 | VNF20 | 2.0 | VNFC201_0,VNFC201_1 |

(c) VNFC configuration data (Table is held only when orchestrator instructs VIM)

| VNFC number | VNFC type | Version | Configuration information |
|---|---|---|---|
| VNFC100_0 | VNFC100 | 1.0 | Image:VNFCI_100_1,NIC_1:1G:ON,NIC_2:1G:ON |
| VNFC100_1 | VNFC100 | 1.0 | Image:VNFCI_100_1,NIC_1:1G:ON,NIC_2:1G:ON |
| VNFC101_0 | VNFC101 | 1.0 | Image:VNFCI_101_1,NIC_1:1G:ON |
| VNFC100_2 | VNFC100 | 1.5 | Image:VNFCI_100_2,NIC_1:1G:ON,NIC_2:1G:OFF |
| VNFC100_3 | VNFC100 | 1.5 | Image:VNFCI_100_2,NIC_1:1G:ON,NIC_2:1G:OFF |
| VNFC101_1 | VNFC101 | 1.5 | Image:VNFCI_101_2,NIC_1:1G:ON |
| ... | ... | ... | ... |

Fig.5

(a) Update condition data (held in advance)

| VNF number | Old version | New version | NW configuration |
|---|---|---|---|
| VNF10 | 1.0 | 1.5 | Distributor is required, and switching NIC: NIC_2 |

(b) Old and new correspondence data (Generated at time of update notification. Deleted at time of update settlement or NW switching-back)

| Receipt number | New VNF number | Old VNF number | VNF type | Version | State |
|---|---|---|---|---|---|
| 1 | VNF10_2 | VNF10_1 | VNF10 | 1.5 | Updating |

(c) VNF configuration data (Generated at time of generation of VNF)

| VNF number | VNF type | Version | Configuration information |
|---|---|---|---|
| VNF10_1 | VNF10 | 1.0 | VNFC100_0,VNFC100_1,VNFC101_0 |
| VNF10_2 | VNF10 | 1.5 | VNFC100_2,VNFC100_3, VNFC101_1 |

(d) VNFC configuration data (when VNFM instructs VIM)

| VNFC number | VNFC type | Version | Configuration information |
|---|---|---|---|
| VNFC100_0 | VNFC100 | 1.0 | Image:VNFCI_100_1,NIC_1:1G:ON,NIC_2:1G:ON |
| VNFC100_1 | VNFC100 | 1.0 | Image:VNFCI_100_1,NIC_1:1G:ON,NIC_2:1G:ON |
| VNFC101_0 | VNFC101 | 1.0 | Image:VNFCI_101_1,NIC_1:1G:ON |
| VNFC100_2 | VNFC100 | 1.5 | Image:VNFCI_100_2,NIC_1:1G:ON,NIC_2:1G:OFF |
| VNFC100_3 | VNFC100 | 1.5 | Image:VNFCI_100_2,NIC_1:1G:ON,NIC_2:1G:OFF |
| VNFC101_1 | VNFC101 | 1.5 | Image:VNFCI_101_2,NIC_1:1G:ON |

Fig.6

(a) Old and new correspondence data (Generated at time of reception of update notification. Deleted at time of deletion of new VNF or old VNF)

| New VNF number | Old VNF number | Version | State |
|---|---|---|---|
| VNF10_2 | VNF10_1 | 1.5 | Updating |

(b) VNF configuration data

| VNF number | VNF type | Version | Configuration information |
|---|---|---|---|
| VNF10_1 | VNF10 | 1.0 | VNFC100_0,VNFC100_1,VNFC101_0 |
| VNF10_2 | VNF10 | 1.5 | VNFC100_2,VNFC100_3, VNFC101_1 |

(c) Setting data

| VNF number | Setting data |
|---|---|
| VNF10_1 | Set value 1:A, Set value 2:B |

UPDATE MANAGEMENT SYSTEM AND UPDATE MANAGEMENT METHOD

TECHNICAL FIELD

The present invention relates to an update management system and an update management method for performing update management of applications that are operated in a virtual server.

BACKGROUND ART

In general, various applications for an information processing service are gradually upgraded (updated) with the passage of an operating period of time (see Patent Document 1). Service is generally stopped temporarily for work of updating such applications for an information processing service.

However, it is difficult to stop service temporarily to perform work of updating an application for a communication service, because a communication service such as mobile communication is a very socially important infrastructure service. If there is a fault in a new version immediately after the update, a recovery process of restoring to an old version is rapidly performed to minimize impact on users.

CITATION LIST

Patent Literature

[Patent Document 1] Japanese Unexamined Patent Publication No. Heisei 11-15647

SUMMARY OF INVENTION

Technical Problem

A conventional application for a communication service has a strong connection to hardware and software, and update of a large number of applications is provided as one function included in the application. Therefore, a procedure of the update work is different according to individual applications and it is difficult to make the work efficient. Further, in an application that does not originally have an update function, it is necessary to perform time-consuming work such as re-installation of a new version after uninstallation of an old version, and it was difficult to efficiently perform work. Meanwhile, it is difficult to efficiently perform work due to the same circumstances as described above for a process for recovery to an old version when there is a fault in the new version. Based on the circumstances described above, effectively executing update-related work including a process for update into the new version and recovery to the old version regardless of a type of application has been hoped for.

Therefore, the present invention has been made to solve the above problems, and an object thereof is to realize efficient and seamless update-related work for a communication service application.

Solution to Problem

An update management system according to one aspect of the present invention includes: a virtualization resource management node that manages each of virtualization resources including a physical server in which a virtual server executing a communication service is generated and generates a new version virtual server based on an instruction to generate the new version virtual server; a service monitor that monitors the communication service executed by the virtual server; a virtual communication function management node that instructs the virtualization resource management node to generate the new version virtual server, generates old and new correspondence data indicating correspondence between the new version virtual server and an old version virtual server, and notifies the service monitor that there is startup of the new version virtual server based on the old and new correspondence data, wherein the virtual communication function management node instructs the virtualization resource management node to perform network switching from the old version virtual server to the new version virtual server, and the virtualization resource management node executes network switching to the new version virtual server based on an instruction for the network switching. With this update management system, it is possible to execute network switching from the old version virtual server to the new version virtual server in a unified process procedure regardless of a type of application, and to realize an efficient and seamless update-related work.

Further, the service monitor may perform synchronization to setting information of the old version virtual server on the new version virtual server, based on the old and new correspondence data that is obtained based on the notification from the virtual communication function management node, the virtual communication function management node may instruct the virtualization resource management node to perform network switching from the old version virtual server to the new version virtual server after completion of the synchronization, and the virtualization resource management node may execute network switching to the new version virtual server based on the instruction for network switching. Thus, it is possible to perform synchronization to setting information of the old version virtual server on the new version virtual server in a unified process procedure regardless of a type of application, and to realize efficient and seamless update-related work.

Further, when there is an abnormality in a new version communication service executed by the new version virtual server through monitoring by the service monitor, the virtual communication function management node may identify the new version virtual server and the old version virtual server based on the old and new correspondence data and request the virtualization resource management node to execute network switching-back from the new version virtual server to the old version virtual server, and the virtualization resource management node may execute the network switching-back from the new version virtual server to the old version virtual server based on a request for the network switching-back. Accordingly, it is possible to execute network switching-back from the new version virtual server to the old version virtual server in a unified process procedure regardless of a type of application, and to realize an efficient and seamless update-related work.

Meanwhile, the update management system may further include an orchestrator that performs entire management of virtualization resources. In this case, the following aspects may be adopted.

That is, the update management system may further include an orchestrator that performs entire management of the virtualization resources, the orchestrator may receive a request for update into a new version of a communication service application, and acquire resource information for the new version virtual server from the virtual communication function management node, reserve resources for the new version virtual server with respect to the virtualization resource management node, and transmit reserved resource information and an instruction for update into the new version to the virtual communication function management node, and the virtual communication function management node may instruct the virtualization resource management node to generate the new version virtual server using the reserved resources. Accordingly, it is possible to execute reservation of resources for a new version virtual server and generation of the new version virtual server using the reserved resources in a unified process procedure regardless of a type of application and to realize efficient and seamless update-related work.

Further, the service monitor may perform synchronization to setting information of the old version virtual server on the new version virtual server, based on the old and new correspondence data that is obtained based on the notification from the virtual communication function management node, and the orchestrator may instruct the virtualization resource management node to perform network switching from the old version virtual server to the new version virtual server after completion of the synchronization. Accordingly, it is possible to execute a network switching instruction from the old version virtual server to the new version virtual server in a unified process procedure regardless of a type of application in the orchestrator and to realize efficient and seamless update-related work.

Further, when there is an abnormality in a new version communication service executed by the new version virtual server through monitoring by the service monitor, the orchestrator may identify the new version virtual server and the old version virtual server based on the old and new correspondence data and requests the virtualization resource management node to execute network switching-back from the new version virtual server to the old version virtual server. Accordingly, it is possible to execute a network switching-back instruction from the new version virtual server to the old version virtual server in a unified process procedure regardless of a type of application in the orchestrator and to realize efficient and seamless update-related work.

The invention according to the "update management system" described above can be recognized as an invention according to the "update management method" and can be described as follows. The invention according to the update management method below has the same operation and effect.

An update management method according to an aspect of the present invention is an update management method that is executed in an update management system including a virtualization resource management node that manages each of virtualization resources including a physical server in which a virtual server executing a communication service is generated, a service monitor that monitors the communication service executed by the virtual server, and a virtual communication function management node that manages the virtual server, the update management method including steps of instructing, by the virtual communication function management node, the virtualization resource management node to generate a new version virtual server, generating old and new correspondence data indicating correspondence between the new version virtual server and an old version virtual server, and notifying the service monitor that there is startup of the new version virtual server based on the old and new correspondence data; generating, by the virtualization resource management node, the new version virtual server based on an instruction to generate the new version virtual server; instructing, by the virtual communication function management node, the virtualization resource management node to perform network switching from the old version virtual server to the new version virtual server; and executing, by the virtualization resource management node, network switching to the new version virtual server based on an instruction for the network switching.

In the "step of executing the network switching", the virtualization resource management node may initially connect the new version virtual server to the network without disconnecting the old version virtual server from the network, a distributor that distributes a destination of a packet from outside in the update management system may distribute the destination of the packet to a new version virtual server in an order from a newly starting process, and the virtualization resource management node may disconnect an old version virtual server from the network when there is no process continued from before switching or when a predetermined new-version monitoring period expires. The network switching as described above is applicable to a communication service in which a process is completed through a round-trip of a plurality of signals, and it is possible to prevent abnormal termination during processing due to network switching even in such a type of communication service.

Advantageous Effects of Invention

According to one aspect of the present invention, it is possible to realize efficient and seamless update-related work for a communication service application.

BRIEF DESCRIPTION OF DRAWINGS

FIGS. 4(a) to 4(c) are diagrams illustrating data held by an orchestrator, FIG. 4(a) illustrates old and new correspondence data, FIG. 4(b) illustrates VNF configuration data, and FIG. 4(c) illustrates VNFC configuration data.

FIGS. 5(a) to 5(c) are diagrams illustrating data held in a VNFM, FIG. 5(a) illustrates update condition data, FIG. 5(b) illustrates old and new correspondence data, FIG. 5(c) illustrates VNF configuration data, and FIG. 5D illustrates VNFC configuration data.

FIGS. 6(a) to 6(c) are diagrams illustrating data held in an EMS, FIG. 6(a) illustrates old and new correspondence data, FIG. 6(b) illustrates VNF configuration data, and FIG. 6(c) illustrates setting data.

DESCRIPTION OF EMBODIMENTS

Figure 1:
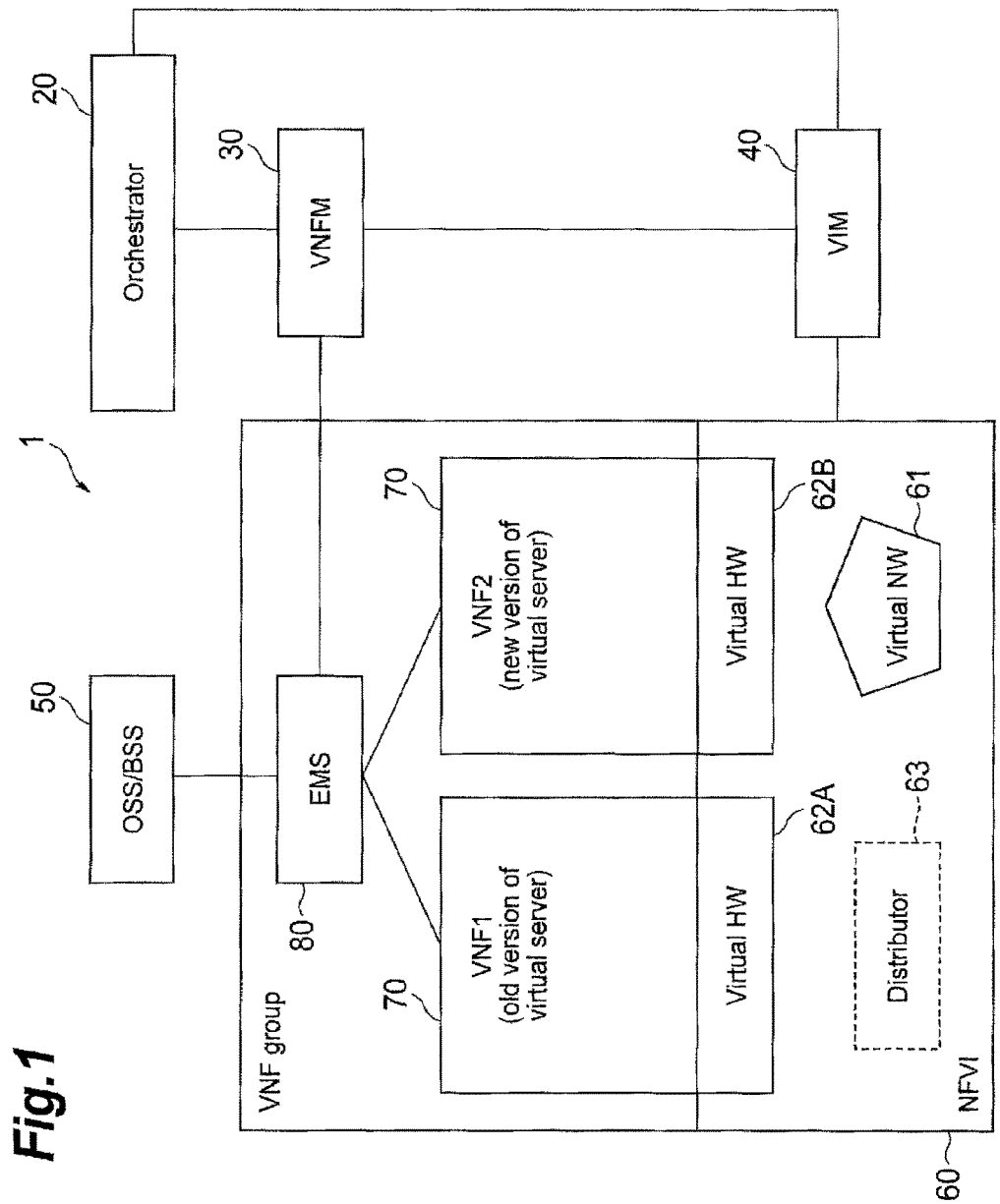
FIG. 1 is an entire configuration diagram of an update management system according to an embodiment of one aspect of the present invention.

Hereinafter, embodiments of an update management system and an update management method according to an aspect of the present invention will be described in detail with reference to the drawings. In description of the drawings, the same elements are denoted with the same reference numerals, and repeated description will be omitted.

[First Embodiment]

Hereinafter, an embodiment regarding an update management method in which an "orchestrator" centrally operates (first method) will be described as a first embodiment.

[Entire Configuration of Update Management System]

FIG. 1 illustrates an entire configuration diagram of an update management system 1 according to this embodiment. The update management system 1 includes an orchestrator 20, a VNFM 30, a virtualized infrastructure manager (VIM) 40, an operations support system/business support system (OSS/BSS) 50, a network functions virtualization infrastructure (NFVI) 60, a virtual network function (VNF) 70, and an element management system (EMS) 80, as illustrated in FIG. 1. Components in which mutual transmission and reception of information are necessary are connected to each other by a cable or the like, and are able to transmit and receive information. Such an update management system 1 is included within a so-called mobile communication system.

In the update management system 1 according to the present embodiment, a communication service is provided to a mobile communication terminal by an application operating in a virtual server that is realized on a physical server. That is, the communication service is provided to the mobile communication terminal by an application according to the communication service being executed by the virtual server.

The NFVI 60 is a physical resource, a virtualization layer, and a virtualized resource constituting a virtual environment. A calculation resource, a storage resource, and a transfer resource are included in the physical resource. The virtualization layer virtualizes the physical resource and provides the virtualized resource to VNF 70 (APL) (for example, a hypervisor). The virtualized resources are virtualized infrastructure resources that are provided to the VNF 70. That is, the NFVI 60 is virtualized resources including a physical server that is a physical server device that performs a communication process in a mobile communication system. For example, as illustrated in FIG. 1, the NFVI 60 includes virtual hardware 62A and 62B, a virtual network 61, and a distributor 63 to be described below. In the drawings, the virtual hardware is abbreviated as "virtual HW", and the virtual network is abbreviated as "virtual NW". The physical server includes a CPU (core processor), a memory, and a storage device such as a hard disk. Usually, a plurality of physical servers constituting the NFVI 60 are arranged at a location of a data center (DC) or the like. In the data center, the arranged physical servers are connected by a network inside the data center, such that the physical servers can transmit and receive information to and from each other. Further, a plurality of data centers are provided in the update management system 1. The data centers are connected by a network, and the physical servers provided in the different data centers can transmit and receive information to and from each other over the network.

The VNF 70 is a virtual server which is a virtual communication processing node that provides a communication service (a function of executing a communication process included by the virtual server). The VNF 70 is realized in the NFVI 60. The VNF 70 is realized, for example, by using a virtual machine (VM) technology, assigning the CPU included in the NFVI 60 for the VNF 70, realizing a virtual machine on the assigned CPU, and executing a program on the virtual machine. The VNF 70 is usually generated (realized) according to a communication process to be executed. Although not shown, the VNF 70 includes one or a plurality of virtual network function components (VNFCs) that are components thereof.

The update management system 1 includes one or more (or a plurality of) VNFs 70. The VNF 70 corresponds to a node such as a call session control function (CSCF) or an application server (AS) in an IMS. Alternatively, the VNF 70 corresponds to, for example, a serving GPRS support node (SGSN) in a general packet radio service (GPRS) system that is one mobile communication system, and to a node such as a mobility management entity (MME) and a serving gateway (S-GW) in a Long Term Evolution/Evolved Packet Core (LTE/EPC) system.

The EMS 80 is a node that monitors and controls the VNF 70. The EMS 80 is also virtually realized in the NFVI 60, similar to the VNF 70. The EMS 80 is produced in association with the VNF 70. The EMS 80 performs monitoring and control of the associated VNF 70. The EMS 80 performs failure, configuration, accounting, performance, and security (FCAPS) management of the VNF 70. The EMS 80 may be realized virtually as in the above description or may be physically realized in order to avoid complexity of the management in performing the FCAPS management.

The OSS/BSS 50 is a node that performs service management in the update management system 1, and instructs the orchestrator 20 or the like to perform a process related to a communication function. For example, the OSS/BSS 50 instructs the orchestrator 20 to start up a new communication service. Further, the OSS/BSS 50 receives information from the EMS 80 and instructs the orchestrator 20 and the EMS 80 based on the information.

The orchestrator 20 is an entire management node (functional entity) that performs entire management of the NFVI 60 which is a virtualization resource. The orchestrator 20 receives the instruction from the OSS/BSS 50 and performs a process according to the instruction. The orchestrator 20 performs management of all of the virtualization resources of a mobile communication network of an infrastructure and a communication service. The orchestrator 20 realizes communication service involving a plurality of VNFs 70 in an appropriate place via the VNFM 30 and the VIM 40. For example, the orchestrator 20 performs life-cycle management of services (specifically, for example, creation, update, scale control, and event collection), and dispersion, reservation, assignment management, service instance management, and policy management of resources (specifically, for example, reservation and assignment, and optimal arrangement based on geography and laws of resources) in the entire mobile communication network.

The VNFM 30 is a virtual communication function management node (functional entity) that manages the VNF 70. A plurality of VNFMs 30 may be provided in the update management system 1. In this case, the VNFM 30 managed for each VNF 70 may be determined in advance. The VNFM 30 performs life cycle management of the VNF 70 (APL). The VNFM 30 performs entire control regarding virtualization of the VNF 70. For example, the VNFM 30 performs generation, update, scale control, termination, and auto-healing (automatic healing) of the VNF 70.

The VIM 40 is a virtualization resource management node (functional entity) that manages virtualization resources (infrastructure resources) of units of realization of the VNF 70 in the NFVI 60. Specifically, the VIM 40 performs management of assignment, update, and recovery of resources, association of virtualization resources with physical resources, and management of a list of hardware resources and SW resources (hypervisor). Usually, the VIM 40 performs management for each data center (station). The management of the virtualization resources can be performed using a scheme according to the data center. A type of scheme of managing the data center (scheme of mounting management resources) includes, for example, OPENSTACK and vCenter. Usually, the VIM 40 is provided for each of schemes of managing the data center. That is, the update management system 1 includes a plurality of VIMs 40 that manage the respective virtualization resources of the units of realization of the VNF 70 in the NFVI 60 in different schemes. The units of virtualization resources managed in different management schemes may not necessarily be units of the data centers.

The orchestrator 20, the VNFM 30, and the VIM 40 are realized by a program being executed on a physical server device (but realization on a virtualization is not limited, and a management system may be separated and then realized on the virtualization). The orchestrator 20, the VNFM 30, and the VIM 40 may be realized in respective separate physical server devices or may be realized on the same server device. The orchestrator 20, the VNFM 30, and the VIM 40 (a program for realizing the orchestrator 20, the VNFM 30, and the VIM 40) may be provided from different vendors.

[Functional Block Configuration in Update Management System 1]

Figure 2:
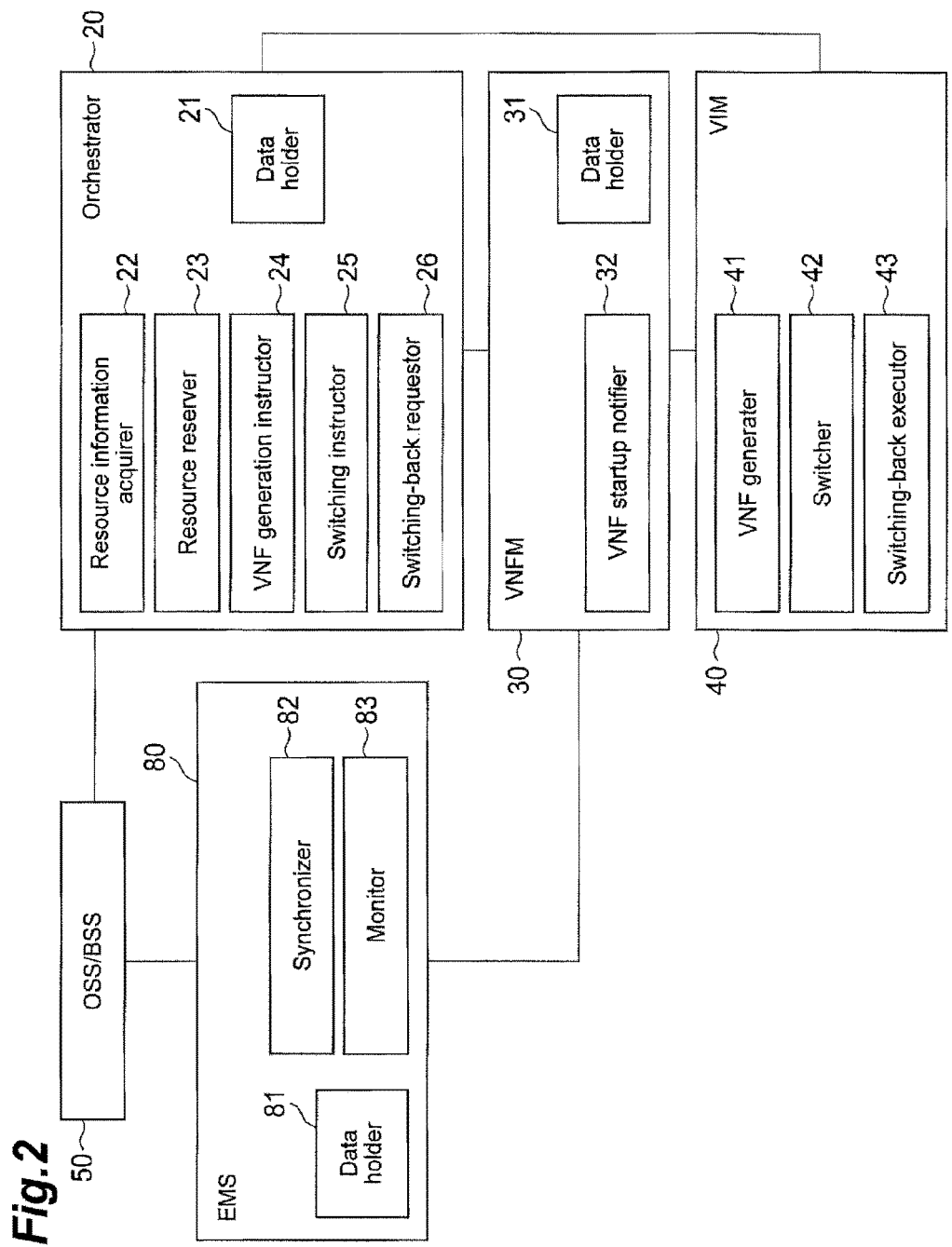
FIG. 2 is a functional block diagram of a first embodiment.

FIG. 2 illustrates a functional block configuration in the first embodiment. A "service monitor" in the claims may correspond to functional blocks including the EMS 80 and the OSS/BSS 50 in FIG. 2, but an example in which the EMS 80 that monitors the VNF executing a service includes a monitor 83 or the like will be described.

First, a functional block configuration associated with the generation of the new version VNF is as follows.

The orchestrator 20 includes a resource information acquirer 22 that receives a request for update into a new version of a communication service application and acquires resource information for a new version VNF from the VNFM, a resource reserver 23 that reserves resources for the new version VNF with respect to the VIM, and a VNF generation instructor 24 that instructs the VIM to generate the new version VNF using the reserved resources, generates and holds old and new correspondence data representing a correspondence between the new version VNF and the old version VNF, and notifies the VNFM of the old and new correspondence data. The VIM 40 includes a VNF generator 41 that generates a new version VNF based on the instruction to generate the new version VNF. The VNFM 30 includes a VNF startup notifier 32 that receives the notification of the old and new correspondence data and notifies the EMS 80 that there is startup of the new version VNF. The EMS 80 includes a synchronizer 82 that performs synchronization to the setting information of the old version VNF on the new version VNF based on the old and new correspondence data that is obtained based on the notification from the VNFM 30. The "old and new correspondence data" is generated as, for example, one record of a database in a table format and held in the database in a table format. A specific example will be described below with reference to FIGS. 4 to 6.

Then, a functional block configuration related to the setting synchronization and the network switching is as follows.

The orchestrator 20 includes a switching instructor 25 that instructs the VIM 40 to perform network switching from the old version VNF to the new version VNF after synchronization is completed. The VIM 40 includes a switcher 42 that executes network switching to the new version VNF based on the network switching instruction. The EMS 80 includes a monitor 83 that monitors a new version communication service that is executed by the new version VNF.

Further, a functional block configuration related to the network switching-back is as follows.

The orchestrator 20 includes a switching-back requestor 26 that specifies the new version VNF and the old version VNF based on the held old and new correspondence data and requests the VIM to perform network switching-back from the new version VNF to the old version VNF if a defect appears in the new version communication service in monitoring performed by the EMS 80. The VIM 40 includes a switching-back executor 43 that executes the network switching-back from the new version VNF to the old version VNF based on a request for the network switching-back.

Further, the orchestrator 20, the VNFM 30, and the EMS 80 include data holders 21, 31, and 81 that hold data such as the old and new correspondence data, which will be described below.

Figure 3:
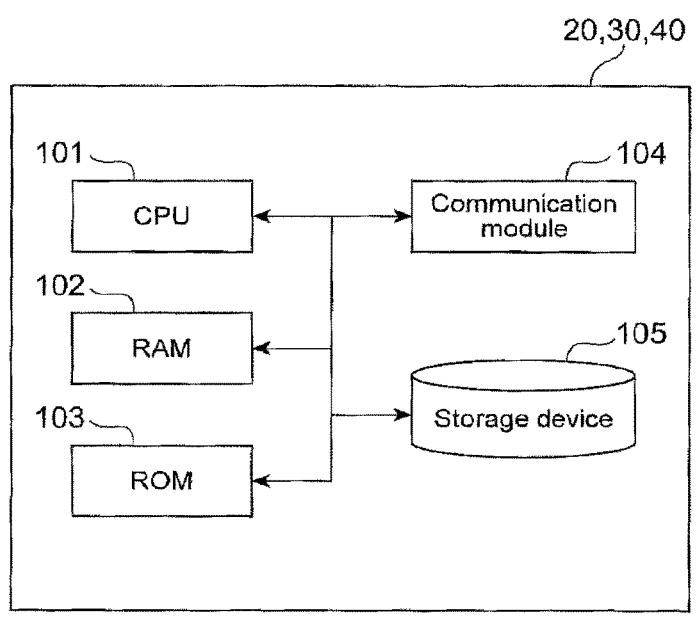
FIG. 3 is a diagram illustrating an example of a hardware configuration of a node included in an update management system.

FIG. 3 illustrates a hardware configuration of a server device constituting the orchestrator 20, the VNFM 30 and the VIM 40. The server device includes a computer including hardware such as a CPU 101, a random access memory (RAM) 102 and a read only memory (ROM) 103 that constitute a main storage device, a communication module 104 for communication, and an auxiliary storage device 105 such as a hard disk, as illustrated in FIG. 3. These components are operated by a program or the like, and accordingly, functions of the orchestrator 20, the VNFM 30, and the VIM 40 described above and to be described below are exhibited. The orchestrator 20, the VNFM 30, and the VIM 40 may be configured using a computer system including a plurality of server devices. Further, a node other than the above node included in the update management system 1 may also be realized by a server device having the above hardware configuration.

[Held Data]

Hereinafter, data held by the orchestrator 20, the VNFM 30, and the EMS 80 will be described.

The orchestrator 20 holds old and new correspondence data illustrated in FIG. 4(a), VNF configuration data illustrated in FIG. 4(b), and VNFC configuration data illustrated in FIG. 4(c) in the data holder 21. Among them, the old and new correspondence data is generated by the orchestrator 20 acquiring necessary information from the VNFM 30 in response to the update notification, and is deleted at the time of subsequent update settlement or network switching-back. In the old and new correspondence data, a receipt number, a new VNF number, an old VNF number, a VNF type, a version, a network configuration, and a state are included, as in FIG. 4(a). In the VNF configuration data, a VNF number, a VNF type, a version, and configuration information are included as in FIG. 4(b), and the configuration information among them is held only when the orchestrator 20 instructs the VIM 40 to perform, for example, network switching and switching-back, as in the first embodiment. In the VNFC configuration data, a VNFC number, a VNFC type, a version, and configuration information are included as in FIG. 4(c), and this VNFC configuration data is held only when the orchestrator 20 instructs the VIM 40 to perform, for example, network switching and switching-back, as in the first embodiment.

The VNFM 30 holds update condition data illustrated FIG. 5(a), old and new correspondence data illustrated in FIG. 5(b), VNF configuration data illustrated in FIG. 5(c), and VNFC configuration data illustrated in FIG. 5D in the data holder 31. Among them, the update condition data is prestored data, and in the update condition data, a VNF type, an old version, a new version, and a network configuration are included as in FIG. 5(a). The old and new correspondence data is generated at the time of update notification by the VNFM 30 and deleted at the time of subsequent update settlement or network switching-back. In the old and new correspondence data, a receipt number, a new VNF number, an old VNF number, a VNF type, a version, and a state are included, as in FIG. 5(b). The VNF configuration data is generated at the time of the VNF generation, and in the VNF configuration data, a VNF number, a VNF type, a version, and configuration information are included as in FIG. 5(c). In the VNFC configuration data, a VNFC number, a VNFC type, a version, and configuration information are included as in FIG. 5D, and this VNFC configuration data is held only when the VNFM 30 instructs the VIM 40 to perform, for example, network switching and switching-back, as in the second embodiment that will be described below.

The EMS 80 holds old and new correspondence data illustrated in FIG. 6(a), VNF configuration data illustrated in FIG. 6(b), and setting data illustrated in FIG. 6(c) in the data holder 81. Among them, the old and new correspondence data is generated at the time of update notification reception by the EMS 80, and is deleted at the time of subsequent new VNF deletion or old VNF deletion. In this old and new correspondence data, a new VNF number, an old VNF number, a version, and a state are included, as in FIG. 6(a). In the VNF configuration data, a VNF number, a VNF type, a version, and configuration information are included as in FIG. 6(b). In the setting data, a VNF number and setting data are included as in FIG. 6(c).

[Processing Content in First Embodiment]

Figure 7:
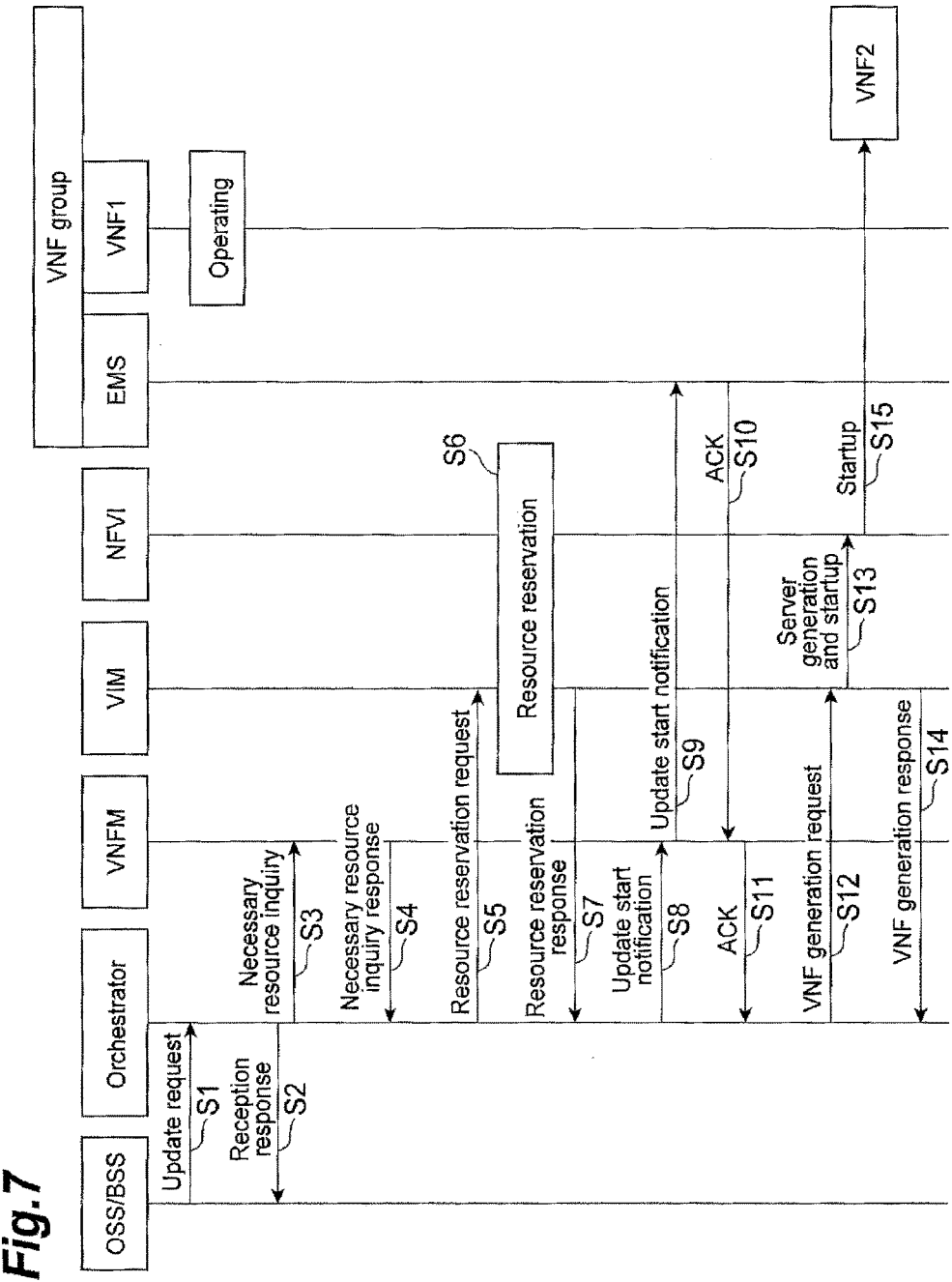
FIG. 7 is a process flow diagram until generation of a new version VNF in the first embodiment.
Figure 8:
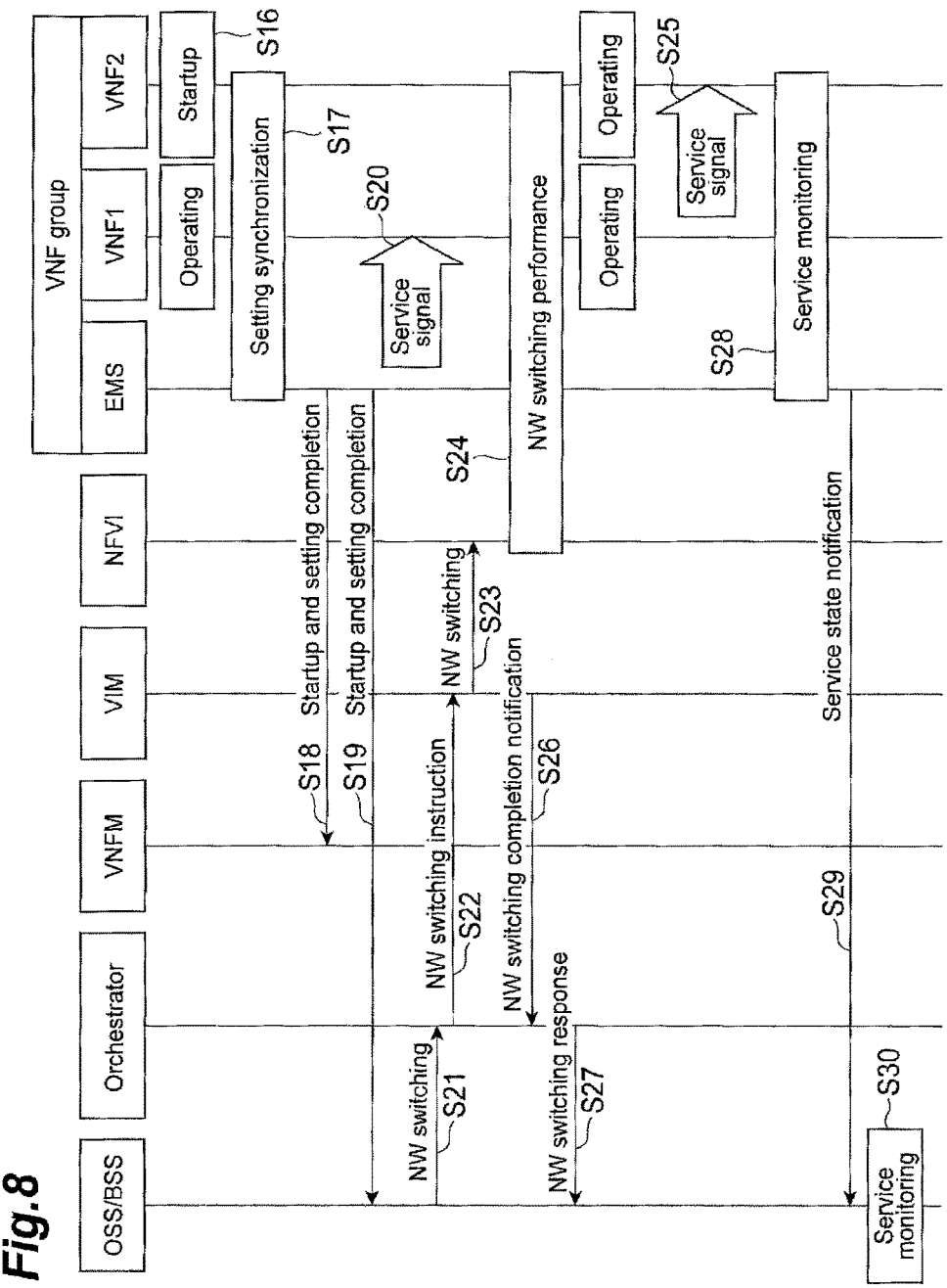
FIG. 8 is a process flow diagram regarding setting synchronization and network switching in the first embodiment.
Figure 9:
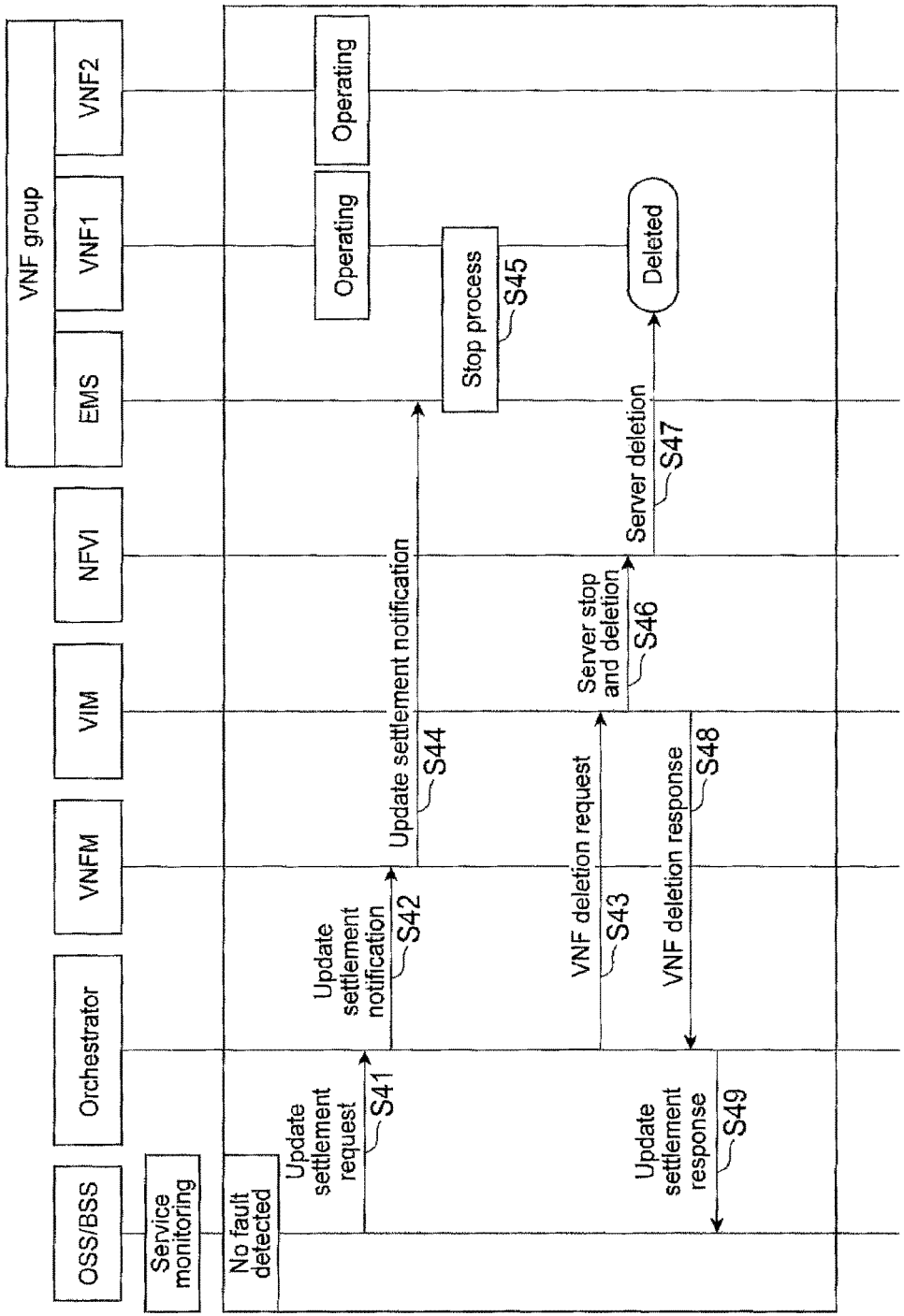
FIG. 9 is a process flow diagram at the time of a normal operation of a new version VNF (at the time of no fault detected) in the first embodiment.
Figure 10:
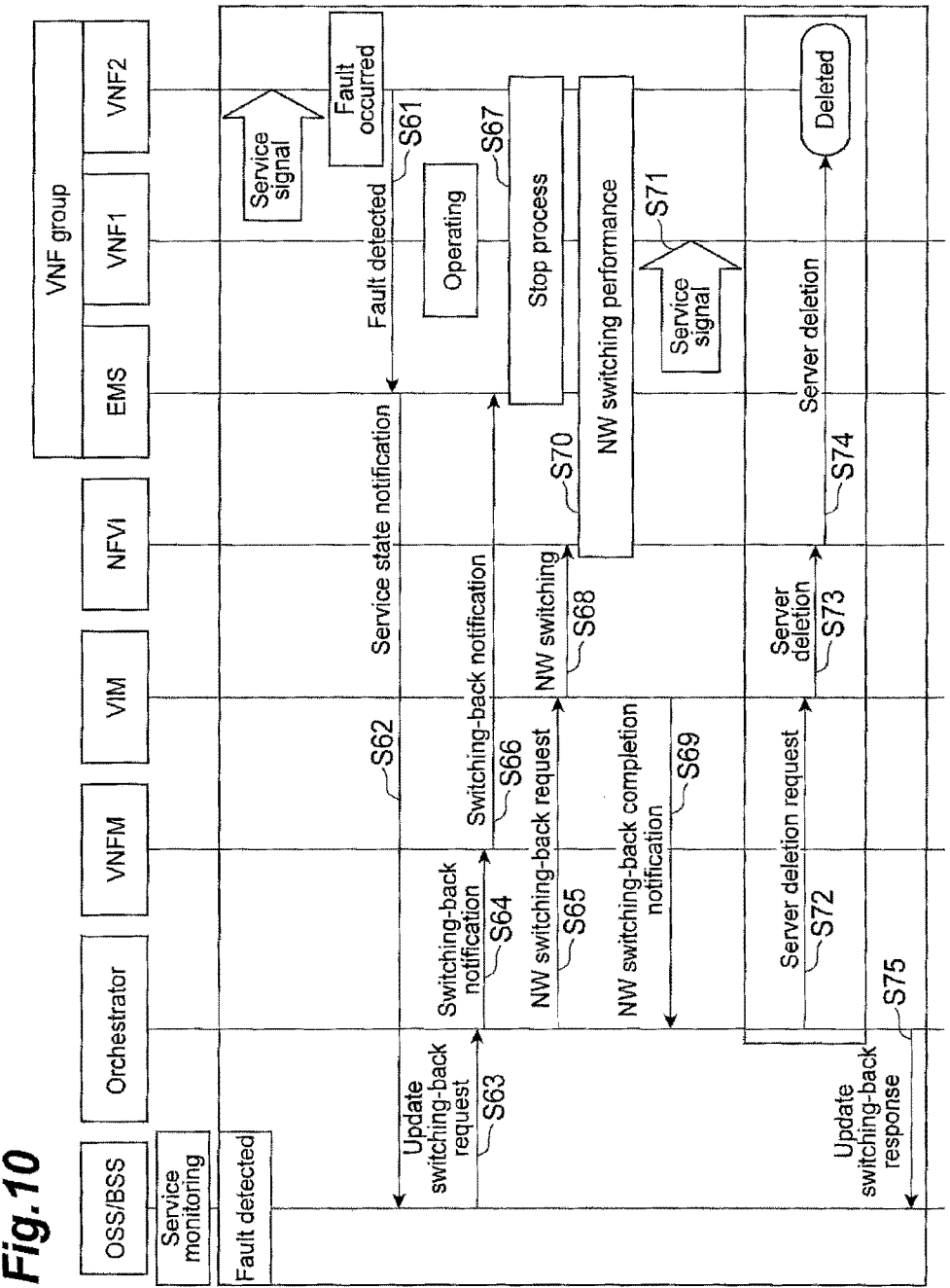
FIG. 10 is a process flow diagram at the time of abnormality occurrence (at the time of fault detected) in a new version VNF in the first embodiment.

Hereinafter, processing content in the first embodiment will be described with reference to FIGS. 7 to 10. A processing flow until generation of a new version VNF is illustrated in FIG. 7, a process flow regarding setting synchronization and network switching is illustrated in FIG. 8, a processing flow at the time of a normal operation of a new version VNF (at the time of no fault detected) is illustrated in FIG. 9, and a process flow at the time of abnormality occurrence in the new version VNF (at the time of fault detected) is illustrated in FIG. 10. The processing flows will be described in order below. In the drawings, a "network" is abbreviated as "NW".

(FIG. 7: Processing flow until generation of the new version VNF) The OSS/BSS specifies a VNF within a target service and requests the orchestrator to perform the update in order to apply a previously generated VNF to the new version (step S1). A correspondence of the target service, a VNF type, and a current version is held in the OSS/BSS in advance or at the time of the VNF generation. A signal transmitted in this case is an update request signal including (a communication service, the VNF type, and version information). (communication service: communication service 1, VNF type: VNF10, and version: 1.5) is illustrated as a setting example.

The orchestrator performs a reception response to the update request (step S2), and then inquires of the VNFM about resource information necessary for a specified version of the VNF in order to generate an update target VNF (step S3). A signal transmitted in this case is a necessary resource inquiry signal including (event number, VNF type, and performance conditions), and (event number: xxxxx (note: a number for association of request-response), VNF type: VNF10, performance condition: 100, and version: 1.5) is illustrated as a setting example. Further, by registering VNF information in the orchestrator in advance, the query of the resource information may be omitted.

The VNFM responds to the orchestrator with resource information meeting performance conditions of a designated version of the VNF which has been requested (step S4). The VNFM holds the performance conditions, the VNF version, and the resource information in advance. A signal transmitted in this case is a necessary information response signal including necessary resource information. (CPU: LOW, number of VMs: 4, network bandwidth: 1 Gbps, and separable DC) is illustrated as a setting example.

The orchestrator performs reservation with respect to the VIM based on information obtained through the inquiry of the necessary resources (step S5). A signal transmitted in this case is a resource reservation request signal including (DC, and necessary resource information (VM and network)). (DC: DC1→DataCenter that the orchestrator derives from the necessary resources, necessary resource information (CPU: High, number of VMs: 1, and network bandwidth: 1 Gbps)) is illustrated as a setting example. Since a subsequent procedure is performed on all types of update-requested VNFs, the procedure is processed repeatedly or in parallel. Further, by registering all of the resource information under VIM control in the orchestrator, the reservation may be performed by the orchestrator or, in this case, the inquiry of the VIM may be omitted.

The VIM performs reservation using reservation request information and resource information under management (step S6) and responds to the orchestrator with reservation completion (step S7). A signal transmitted in this case is a resource reservation response signal including a reservation number.

When the reservation is completed, the orchestrator issues an ID to VNF after the update, generates and maintains a record in an old and new correspondence table (that is, old and new correspondence data in FIG. 4(*a*)), and notifies the VNFM managing the update target VNF of start of update in advance (step S8). A VNF type corresponding to a notification destination VNFM is held in the orchestrator. A signal transmitted in this case is an update start notification signal including (VNF type, old VNF number, new VNF number, and update version). (VNF type: VNF10, old VNF number: VNF10_1, new VNF number: VNF10_2, and version: 1.5) is illustrated as a setting example.

The VNFM having received the update start notification signal generates and holds a record (that is, old and new correspondence data in FIG. 5(*b*)) of the old and new correspondence table based on information within the received update start notification signal. The VNFM notifies the EMS performing setting management of the VNF of update start in advance in order to synchronize the setting information to the VNF that has started up at the new version (step S9). A signal notified of in this case is an update start notification signal including (old VNF number, new VNF number, and update version), and (old VNF number: VNF10_1, new VNF number: VNF10_2, and version; 1.5) is illustrated as a setting example.

The EMS receives the request and then responds with ACK (step S10). In this case, the EMS generates and holds a record (that is, old and new correspondence data in FIG. 6(*a*)) of the old and new correspondence table based on the information within the signal from the VNFM.

When the VNFM receives an ACK response from the EMS, the VNFM responds to the orchestrator with an ACK (step S11). At the time of this response, the VNFM assigns VNF configuration, arrangement, and startup information. A signal transmitted in this case is an ACK signal including the VNF configuration, arrangement, and startup information. (VNFC type, number, and configuration information (Image: VNFCI_100_1, NIC_1: 1G: ON, and NIC_2: OFF)) is illustrated as a setting example.

After the update start notification is completed, the orchestrator requests the VIM to perform VNF generation (step S12). However, in addition to network configuration information, a network connection state is designated for network switching at the time of the VNF generation so that a new version of VNF is not connected to the network until the switching timing. A signal transmitted in this case is a VNF generation request signal including (reservation number, arrangement and startup information, and network configuration information (bandwidth, configuration, and network connection state)). (Arrangement and startup information: DC:DC2, CPU: High, number of VMs: 1, VNFC type: VNFC100 and VNFCI_100_2, and network configuration information (bandwidth: 1 Gbps, configuration: {NIC_1, IP address, ON}, {NIC_2, IP address, and OFF})) is illustrated as a setting example.

The VIM receives the generation request and performs server generation and startup with respect to the NFVI (step S13). After the server generation and startup are performed, the VIM sends a notification of the VNF generation response (step S14). A signal transmitted in this case is a VNF generation response signal including (reservation number, success or fault, and server identification number), and (reservation number: reservation number at the time of generation, success or fault: startup success and fault, and server identification number: identifier VNFC100_2 of the virtual server that has started up) is illustrated as a setting example.

Accordingly, the NFVI starts up the VNF2 (a new version of VNF) through the server generation and startup in step S15. If there are a plurality of servers, the server is repeatedly generated.

(FIG. 8: Process Flow Regarding Setting Synchronization and Network Switching)

In the new version of VNF2, booting of the server is executed and the application is started up (step S16).

After the application starts up, the EMS specifies the new version of the VNF (VNF2) and the old version of the VNF (VNF1) version by referring to the held old and new correspondence table, and performs synchronization with setting information of the old version of VNF1on the VNF while communicating with the VNF1and the VNF12(step S17).

When synchronization is completed, the EMS notifies the VNFM and the OSS/BSS of startup completion (steps S18 and S19). A signal transmitted in this case is a startup and setting completion signal including the VNF number. As a setting example, (VNF number: VNF10_2) is illustrated. However, at this time, the VNF1 still processes a signal regarding a service (step S20).

After the new VNF confirms startup and setting completion, the OSS/BSS requests the orchestrator to perform network switching (step S21). A signal transmitted in this case is a network switching request signal including (receipt number, VNF type, and switching source VNF number). As a setting example, (receipt number: a receipt number issued at the time of an update request, VNF type: update target VNF type (VNF10), and switching source VNF number: switching target VNF number (VNF10_1)) is illustrated.

The orchestrator receives the switching request, confirms the old and new correspondence table using a switching source VNF number (old VNF number) as a key to specify the number of the switching target VNF (new VNF number), and transmits the network switching instruction to the VIM managing a switching target VNF (a new VNF) (step S22). In the network switching instruction, if a connection to the distributor 63 of FIG. 1 is necessary, predetermined information necessary for the connection is provided. The distribution in the distributor 63 will be described below with reference to FIG. 3. A signal transmitted in this case is a network switching instruction signal including (reservation number, server identification number, and network configuration information), and (reservation number: a number at the time of resource reservation, server identification number: a server identification number for performing switching, and network configuration information (bandwidth: 1 Gbps, configuration: NIC_2, IP address, and ON (connection to the switching device)) is illustrated as a setting example.

The VIM performs network switching on the NFVI in response to the network switching instruction (step S23).

The NFVI performs network switching (step S24), and accordingly, a signal regarding the service is transmitted to the VNF2. Specifically, for the switching of the network, the same IP address is assigned to server 1 and server 2, and a transmission destination NIC (virtual port) for the same assigned IP packet is changed using a mechanism for changing a destination based on a flow (defined in a combination of some fields within an IP packet and an Ether frame) as in OpenFlow to thereby realize the network switching. Accordingly, a signal relating to the service is transmitted to server 2 (step S25), and execution of the process in server 2 is started.

The VIM transmits a network switching completion notification to the orchestrator (step S26), and the orchestrator transmits a network switching response to the OSS/BSS (step S27).

The EMS and the VNF notify the OSS/BSS of a state (for example, the number of times of the processing success or fault) of the service (steps S28 and S29). The notified state is different according to the service.

The OSS/BSS monitors the notification of the state of the service, and performs service monitoring to determine whether there is no fault for a certain period of time (step S30).

(FIG. 9: Processing Flow at the Time of Normal Operation of a New Version VNF (at the Time of No Fault Detected))

A process when a determined service monitoring period expires and fault is not detected is as follows.

The OSS/BSS transmits an update settlement request to the orchestrator (step S41). As a transmission trigger, a person decides or automatic transmission is performed after a certain period of time elapses. A signal transmitted in this case is an update settlement request signal including a receipt number, and (receipt number: receipt number issued at the time of update request) is illustrated as a setting example.

The orchestrator acquires the VNF number of the old version VNF (VNF1) to be deleted by referring to the held old and new correspondence table using the VNF number of the new version VNF as a key, and notifies the VNFM of the update settlement notification (step S42), and transmits a request for deletion of the old VNF to the VIM (step S43). As the update settlement notification in this case, an update settlement notification signal including (VNF type: VNF100 and VNF number: VNF100_1) is transmitted. Further, a VNF deletion request signal including (reservation number and VNF number: VNF100_1) is transmitted as the deletion request, and (reservation number: reservation number when the old VNF is generated) is illustrated as a setting example.

The VNFM notifies the EMS of the update settlement notification (step S44). A signal transmitted in this case is an update settlement notification signal including (VNF type: VNF100, and VNF number: VNF100_1).

The EMS receives the update settlement notification and performs a process of stopping the old VNF application (step S45). At the time of the stop process, retraction of a log of the old VNF, or the like may also be included.

The VIM receives the deletion request and performs server stop and deletion on the NFVI (step S46), responds to the orchestrator with an execution result (step S48), and releases the resources. A signal transmitted in this case is a VNF deletion response signal including the reservation number. Accordingly, the VNF1is extinguished through the deletion performance in step S47.

The orchestrator receives the deletion response and notifies the OSS/BSS of the update settlement response (step S49).

(FIG. 10: Processing Flow at the Time of Occurrence of Abnormality in the New Version VNF (at the Time of Fault Detected))

When a fault is generated on the new VNF (VNF2), the EMS detects the fault (step S61) and the EMS notifies the OSS/BSS that there is an abnormality in the service process (step S62).

The OSS/BSS requests the entire management to perform an update switching-back request for return to before the update (step S63). A signal transmitted in this case is an update switching-back request signal including (receipt number and deletion necessity).

The orchestrator receives the update switching-back notification, recognizes a correspondence relationship between old and new versions of VNFs by referring to the held old and new correspondence table, acquires a VNF number of the new version VNF (VNF2), transmits a switching-back notification to the VNFM (step S64), and transmits the network switching-back request to the VIM (step S65). As a signal transmitted in this case, a switching-back notification signal including (VNF number: VNF100_2) is transmitted. Further, as a network switching-back request, a network switching-back request signal including a reservation number with which the new VNF is reserved is transmitted.

The VNFM transmits a switching-back notification to the EMS (step S66). A signal transmitted in this case is a switching-back notification signal including (VNF number: VNF100_2).

The EMS managing the VNF stops the application of the VNF (step S67).

The VIM instructs the NFVI to perform network switching (step S68), and transmits a network switching-back response to the orchestrator (step S69).

The NFVI performs network switching (step S70). Accordingly, a service-related signal is transmitted to the VNF1(step S71).

The orchestrator receives the network switching-back response from the VIM and notifies the OSS/BSS of the update switching-back response (step S75). In this case, the orchestrator performs a server deletion process according to a deletion necessity in the switching-back request. That is, the orchestrator transmits the server deletion request to the VIM (step S72), the VIM instructs the NFVI to perform the server deletion (step S73), and the NFVI deletes the server (VNF2) (step S74).

The old and new correspondence data (the record within the old and new correspondence table) held by the orchestrator and the VNFM is deleted at the time of update settlement or network switching-back. The old and new correspondence data (the record within the old and new correspondence table) held by the EMS is deleted at the time of deletion of the new VNF or the old VNF.

[State Transition of Update]

Figure 11:
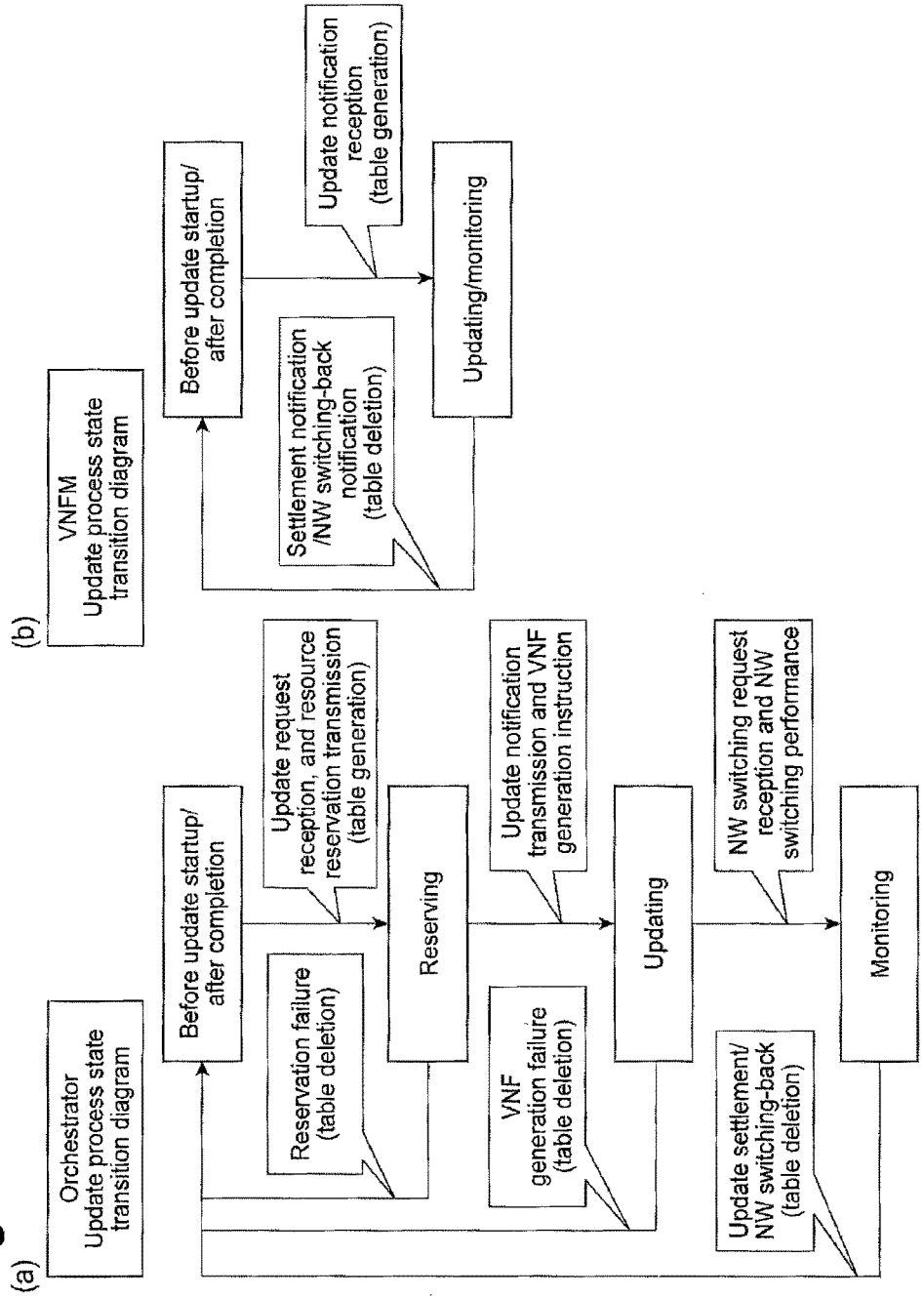
FIGS. 11(*a*) and 11(*b*) are diagrams illustrating a state transition of update in the first embodiment, FIG. 11(*a*) illustrates a state transition of update in an orchestrator, and FIG. 11(*b*) illustrates a state transition of update in a VNFM.

Here, a state transition of update of each of the orchestrator 20 and the VNFM 30 in the first embodiment will be described with reference to FIG. 11. A "table" described in FIG. 11 means one record of the old and new correspondence data.

As illustrated in FIG. 11(a), "state of update" of the orchestrator 20 transitions from an initial state (before update startup/after completion) to "reserving" when the orchestrator 20 receives an update request, transmits resource reservation, and generates a table associated with this update. Here, if the reservation fails and the above table is deleted, the state of the update returns to an initial state.

Then, when the orchestrator 20 transmits an update notification to instruct VNF generation, the state of the update transitions from "reserving" to "updating". Here, if the VNF generation fails and the above table is deleted, the state of the update returns to an initial state.

Further, when the orchestrator 20 receives the network switching request and performs network switching, the state of the update transitions from "updating" to "monitoring". Then, if the update is settled or the network is switched back and the table is deleted, the state of the update returns to an initial state.

As illustrated in FIG. 11(b), the "state of update" of the VNFM 30 transitions from an initial state (after update startup/after completion) to "updating/monitoring" when the VNFM 30 receives the update notification and generates the table related to current update. Then, if update settlement notification or network switching-back notification is received and the table is deleted, the state of the update returns to the initial state.

[Network Switching Method]

Here, a method of network switching to a new version VNF will be described. In this embodiment, a new version of VNF of which a setting is synchronized to that of an old version of VNF1is generated, and a data flow of the network is switched from VNF1to VNF2, to thereby execute network switching to the VNF2. Examples of a network switching method in this case include a method of performing switching at once at a certain timing (a first method), and a method of gradually distributing a destination of a packet to VNF in order from a newly starting process (a second method). The first method is applicable to a service in which a process is completed in one round-trip of request/response, and the second method is applicable to a service in which a process is completed in a round-trip of a signal a plurality of times. Hereinafter, the methods will be sequentially described.

(First Method)

Figure 12:
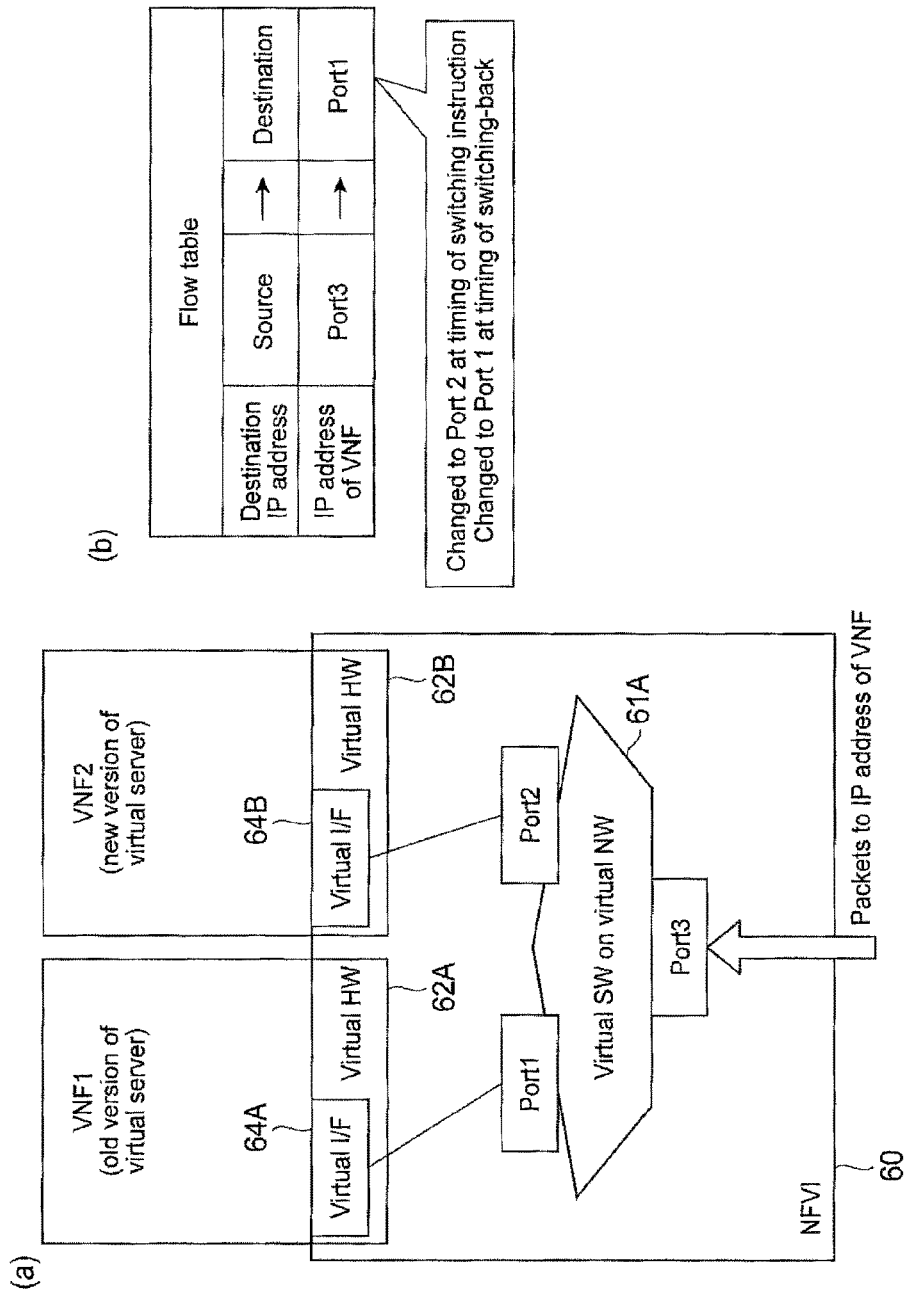
FIGS. 12(*a*) and 12(*b*) are diagrams illustrating a first method of network switching, FIG. 12(*a*) is a configuration diagram when the first method is executed, and FIG. 12(*b*) illustrates a flow table.

FIG. 12(a) illustrates a configuration diagram when a first method is executed. That is, in the NEVI 60, a virtual switch 61A on a virtual network is generated, and in the virtual switch 61A, port 3 that is an interface for a packet from outside, port 1 connected to the virtual interface 64A of the old version VNF1, and port 2 connected to a virtual interface 64B of the new version VNF are generated. In FIG. 12(a), "virtual switch" is abbreviated as "virtual SW", and "virtual interface" is abbreviated as "virtual IX".

The virtual switch 61A holds a flow table illustrated in FIG. 12(b) therein, and switches a transfer destination of the data according to content of the flow table. In this example, the virtual switch 61A transfers a packet (IP-addressed packet of the VNF from an external network) input from port 3 to port 1 to transfer the packet to the old version of VNF1before network switching, as illustrated in the flow table in FIG. 12(b). The virtual switch 61A changes a "transfer destination" of the flow table to port 1 at a timing of the network switching instruction, and transfers a subsequent IP-addressed packet of the VNF from the external network to port 2. Accordingly, network switching to the new version of VNF is executed normally. Then, the virtual switch 61A changes the "transfer destination" of the flow table to port 1 at a timing of network switching-back if a fault is generated in VNF2, and transfers a subsequent IP-addressed packet of the VNF from the external network to port 1. Accordingly, the network switching-back to the old version of VNF1is executed normally.

(Second Method)

Figure 13:
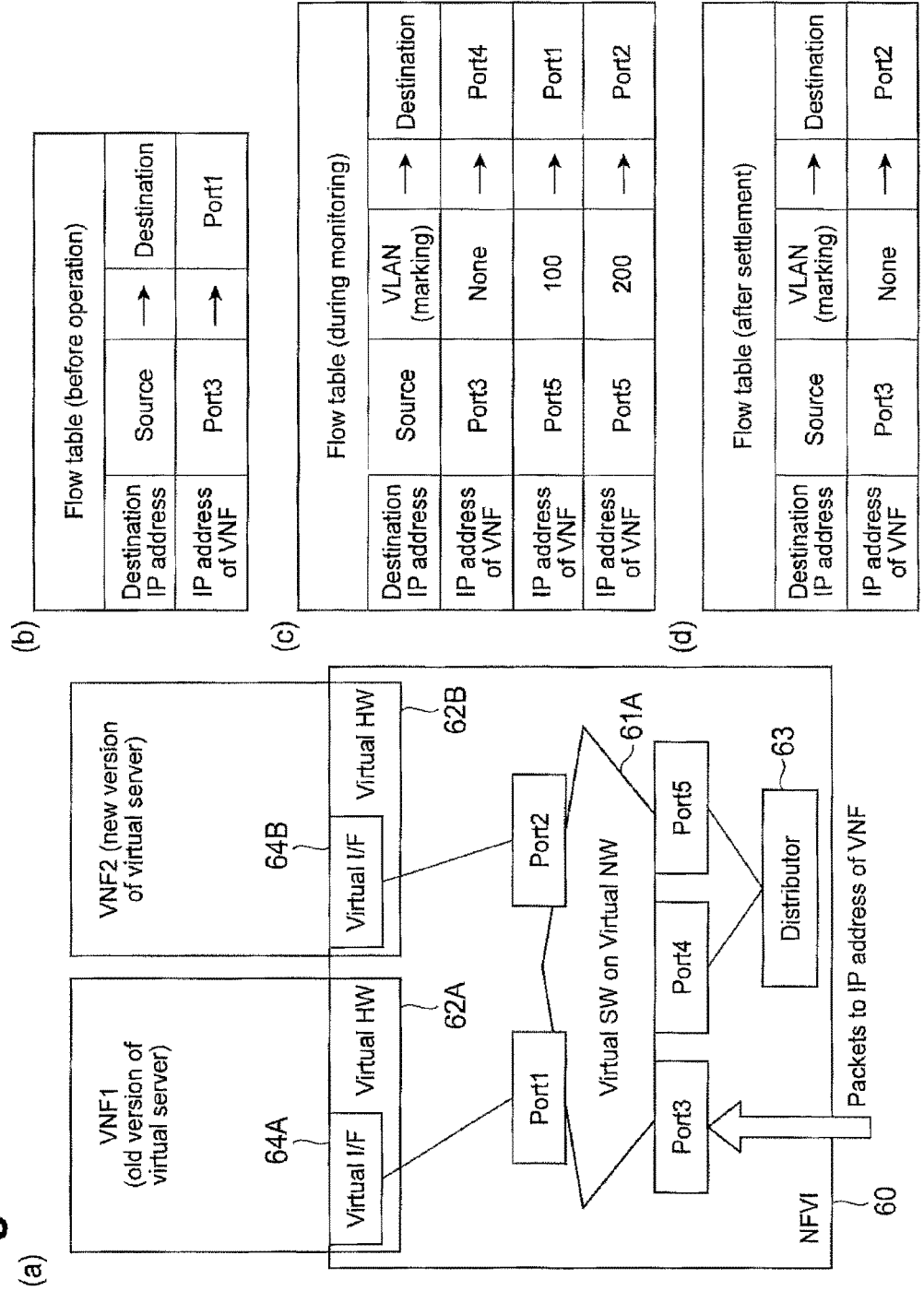
FIGS. 13(*a*) to 13(*d*) are diagrams illustrating a second method of network switching, FIG. 13(*a*) is a configuration diagram when the second method is executed, FIG. 13(*b*) illustrates a flow table before an operation, FIG. 13(*c*) illustrates a flow table during monitoring, and FIG. 13(*d*) illustrates a flow table after settlement.

FIG. 13(a) illustrates a configuration diagram when a second method is executed. That is, in the NFVI 60, a virtual switch 61A and a distributor 63 on a virtual network are generated, and in the virtual switch 61A, port 4 for output to the distributor 63 and port 5 for reception of an input from the distributor 63 are generated in addition to ports 1 to 3 that are the same as those in FIG. 12(a). A method of realizing the distributor 63 is not limited to a specific method and, for example, the distributor 63 may be realized by temporarily connecting an existing virtual server or may be realized by a temporarily generated virtual server.

The virtual switch 61A holds flow tables illustrated in FIGS. 13(b) to 13(d) therein and switches the transfer destination of the data according to content of the flow tables. The virtual switch 61A transfers a packet input from port 3 (an IP-addressed packet of the VNF from the external network) to port 1 to transfer the packet to the old version of VNF1, as illustrated in the flow table illustrated in FIG. 13(b) before a network switching operation. In a monitoring state after the network switching instruction, the virtual switch 61A transfers the packet input from port 3 (an IP-addressed packet of VNF from the external network) to port 4 to transfer the packet to the distributor 63, as illustrated in the flow table in FIG. 13(c).

The distributor 63 determines whether the received packet is a packet in a continued process or a new process packet. When the received packet is a packet in a continued process, the distributor 63 marks attribute information (for example, a virtual local area network (VLAN)) of the packet with "100", and transfers the resultant packet to the virtual switch 61A. When the received packet is a new process packet, the distributor 63 marks the attribute information (for example, a VLAN) of the packet with "200", and transfers the resultant packet to the virtual switch 61A.

The virtual switch 61A confirms a VLAN of a packet input from port 5 (a packet from the distributor 63) as illustrated in the flow table in FIG. 13(c), and the VLAN transfers a packet of "100" (a packet in a continued process) to port 1, and transfers a packet of "200" (a packet in a new process) to port 2. Accordingly, the packet in the continued process is transferred to the old version of VNF1, and a packet in a new process is transferred to the new version of VNF2.

Then, after a predetermined new-version monitoring period expires and the switching is settled, the virtual switch 61A transfers a packet input from port 3 (an IP-addressed packet of the VNF from the external network) to port 1 as illustrated in the flow table in FIG. 13(d), to transfer the packet to the new version of VNF2. Accordingly, the network switching to the new version of VNF2 is completed. The process may transition to a transfer based on the flow table of FIG. 13(d) at a timing at which there is no packet in the continued process, other than the predetermined new-version monitoring period expiration.

In the second method described above, it is possible to prevent abnormal termination during processing due to network switching even in the service in which the process is completed in a round-trip of a signal a plurality of times.

In the first embodiment described above, it is possible to efficiently execute update-related work including a process for update into the new version and recovery to the old version in a unified process procedure regardless of a type of application. That is, it is possible to realize efficient and seamless update-related work.

[Second Embodiment]

Hereinafter, an embodiment regarding an update management method (second method) in which a "virtual communication function management node (VFNM)" centrally operates will be described as a second embodiment.

[Functional Block Configuration in Update Management System 1]

Figure 14:
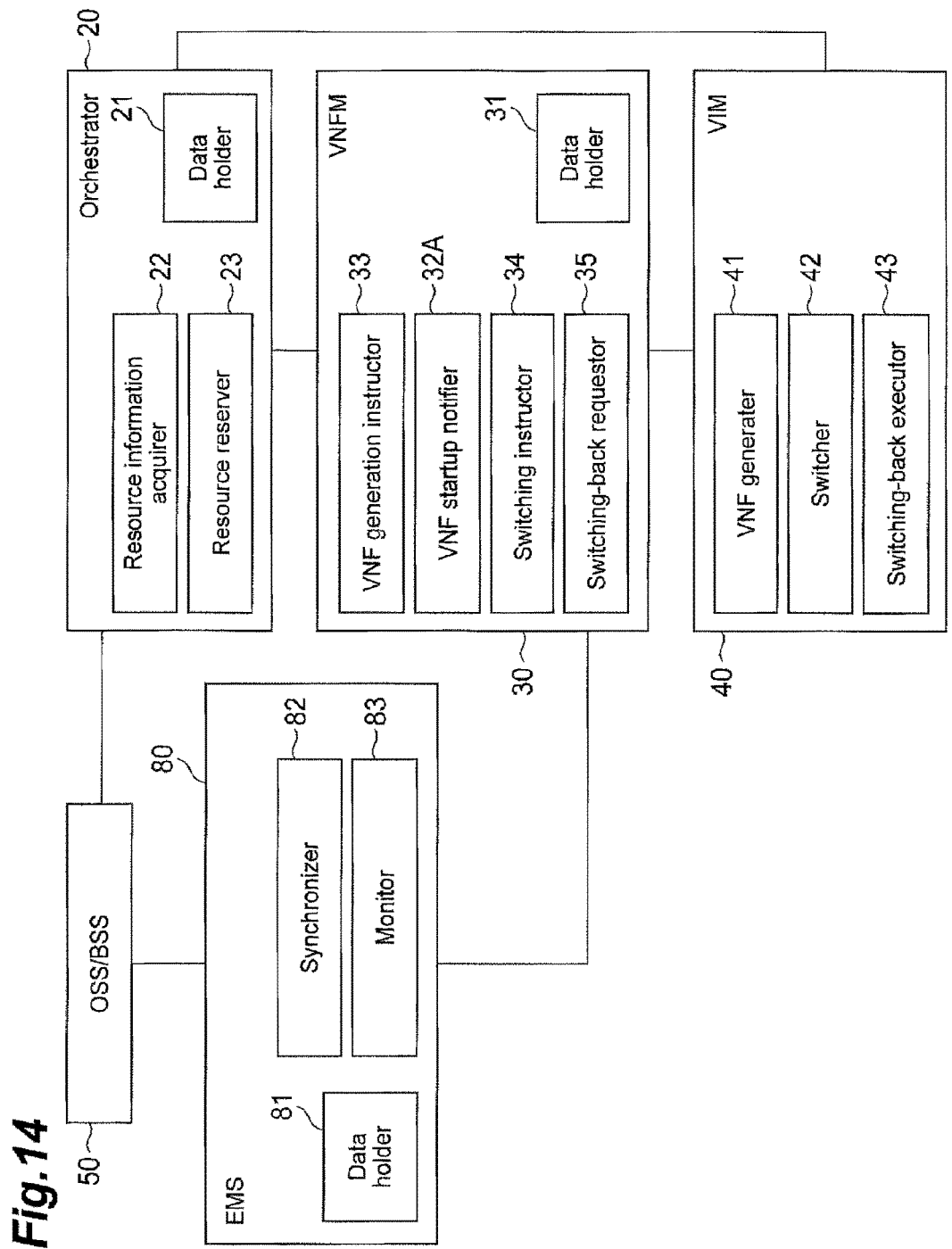
FIG. 14 is a functional block diagram of the second embodiment.

FIG. 14 illustrates a functional block configuration in the second embodiment.

First, a functional block configuration associated with the generation of the new version VNF is as follows.

The orchestrator 20 includes a resource information acquirer 22 that receives a request for update into a new version of a communication service application and acquires resource information for a new version VNF from the VNFM, a resource reserver 23 that reserves resources for the new version VNF with respect to the VIM 40 and transmits the reserved resource information and an instruction to update into the new version to the VNFM. The VNFM 30 includes a VNF generation instructor 33 that instructs the VIM 40 to generate the new version VNF using the reserved resources and generates and holds old and new correspondence data representing a correspondence between the new version VNF and the old version VNF, and a VNF startup notifier 32A that notifies the EMS 80 that there is startup of the new version VNF based on the generated old and new correspondence data. The VIM 40 includes a VNF generator 41 that generates a new version VNF based on the instruction to generate the new version VNF. The EMS 80 includes a synchronizer 82 that performs synchronization to the setting information of the old version VNF on the new version VNF based on the old and new correspondence data that is obtained based on the notification from the VNFM 30.

Then, a functional block configuration related to the setting synchronization and the network switching is as follows.

The VNFM 30 further includes a switching instructor 34 that instructs the VIM 40 to perform network switching from the old version VNF to the new version VNF after synchronization is completed. The VIM 40 further includes a switcher 42 that executes network switching to the new version VNF based on the network switching instruction. The EMS 80 further includes a monitor 83 that monitors a new version communication service that is executed by the new version VNF.

Further, a functional block configuration related to the network switching-back is as follows.

The VNFM 30 further includes a switching-back requestor 35 that specifies the new version VNF and the old version VNF based on the held old and new correspondence data and requests the VIM 40 to perform network switching-back from the new version VNF to the old version VNF if a defect appears in the new version communication service in monitoring performed by the EMS 80. The VIM 40 further includes a switching-back executor 43 that executes the network switching-back from the new version VNF to the old version VNF based on a request for the network switching-back.

Further, the orchestrator 20, the VNFM 30, and the EMS 80 include data holders 21, 31, and 81 that hold data such as the old and new correspondence data described in the first embodiment.

Since a hardware configuration (FIG. 3) is the same as in the first embodiment, description thereof is omitted. Further, since the held data (FIGS. 4 to 6) is the same as in the first embodiment, repeated description is omitted.

[Processing Content in Second Embodiment]

Figure 15:
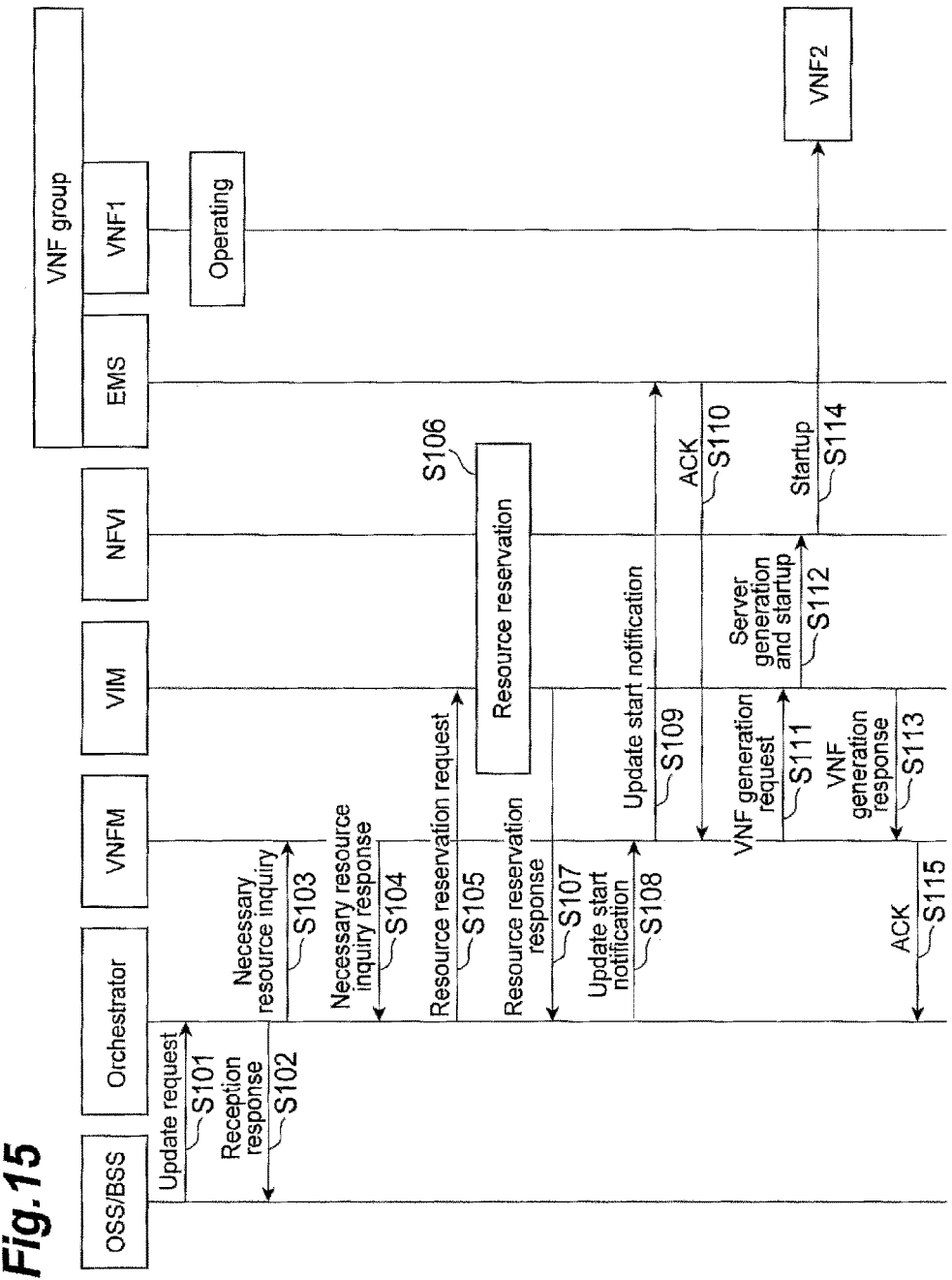
FIG. 15 is a process flow diagram until generation of a new version VNF in the second embodiment.
Figure 16:
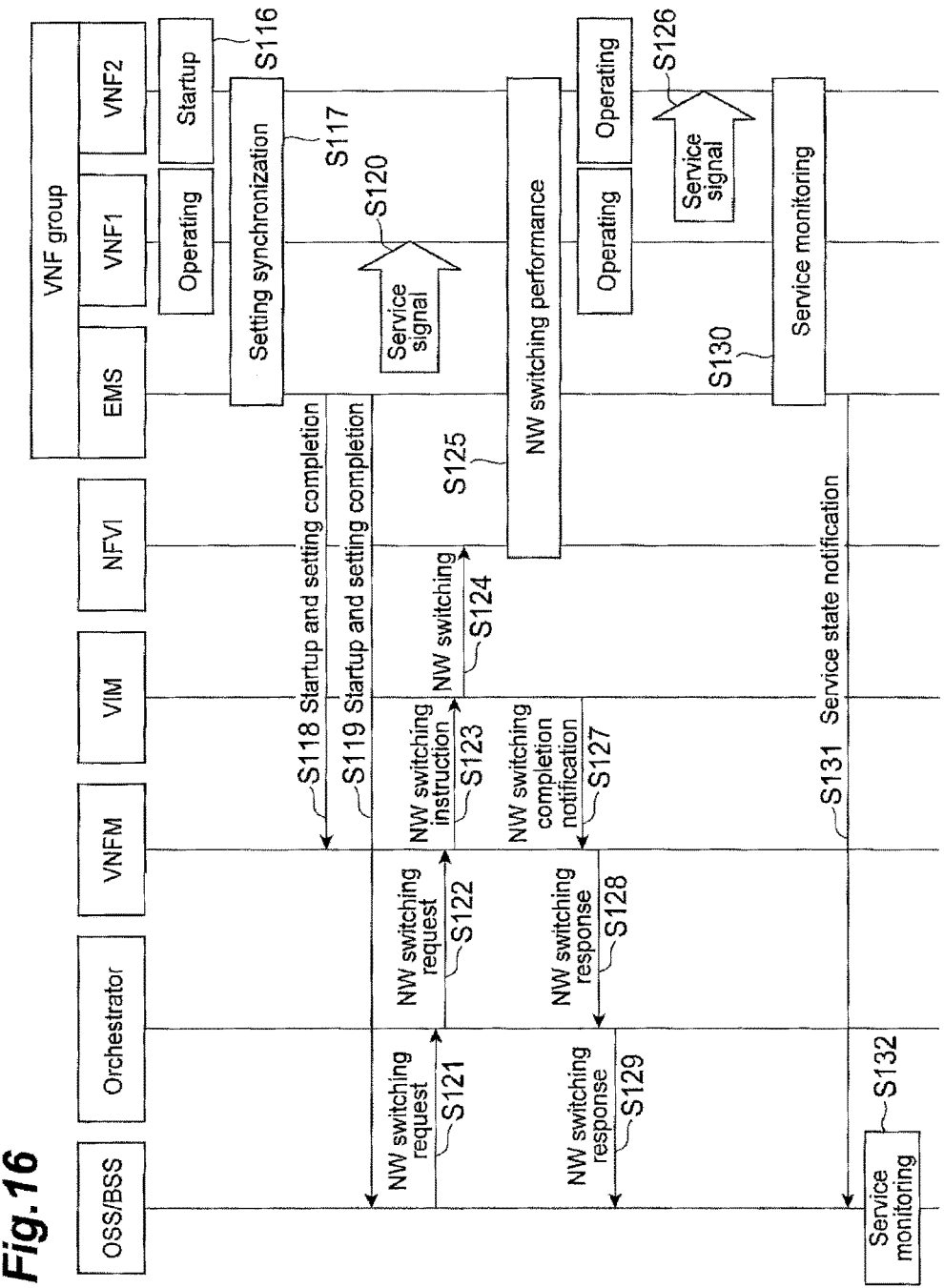
FIG. 16 is a process flow diagram regarding setting synchronization and network switching in the second embodiment.
Figure 17:
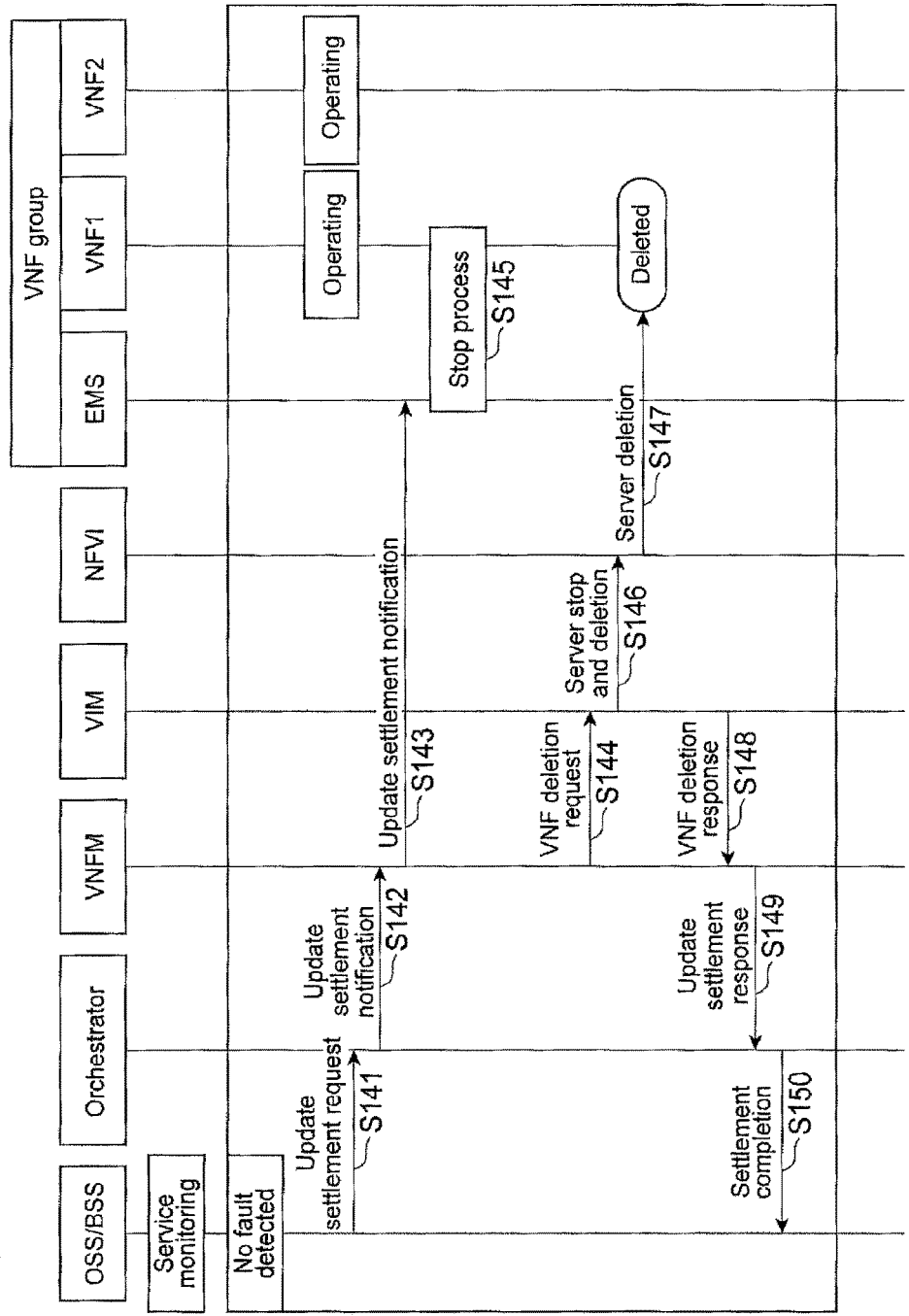
FIG. 17 is a process flow diagram at the time of a normal operation of a new version VNF (at the time of no fault detected) in the second embodiment.
Figure 18:
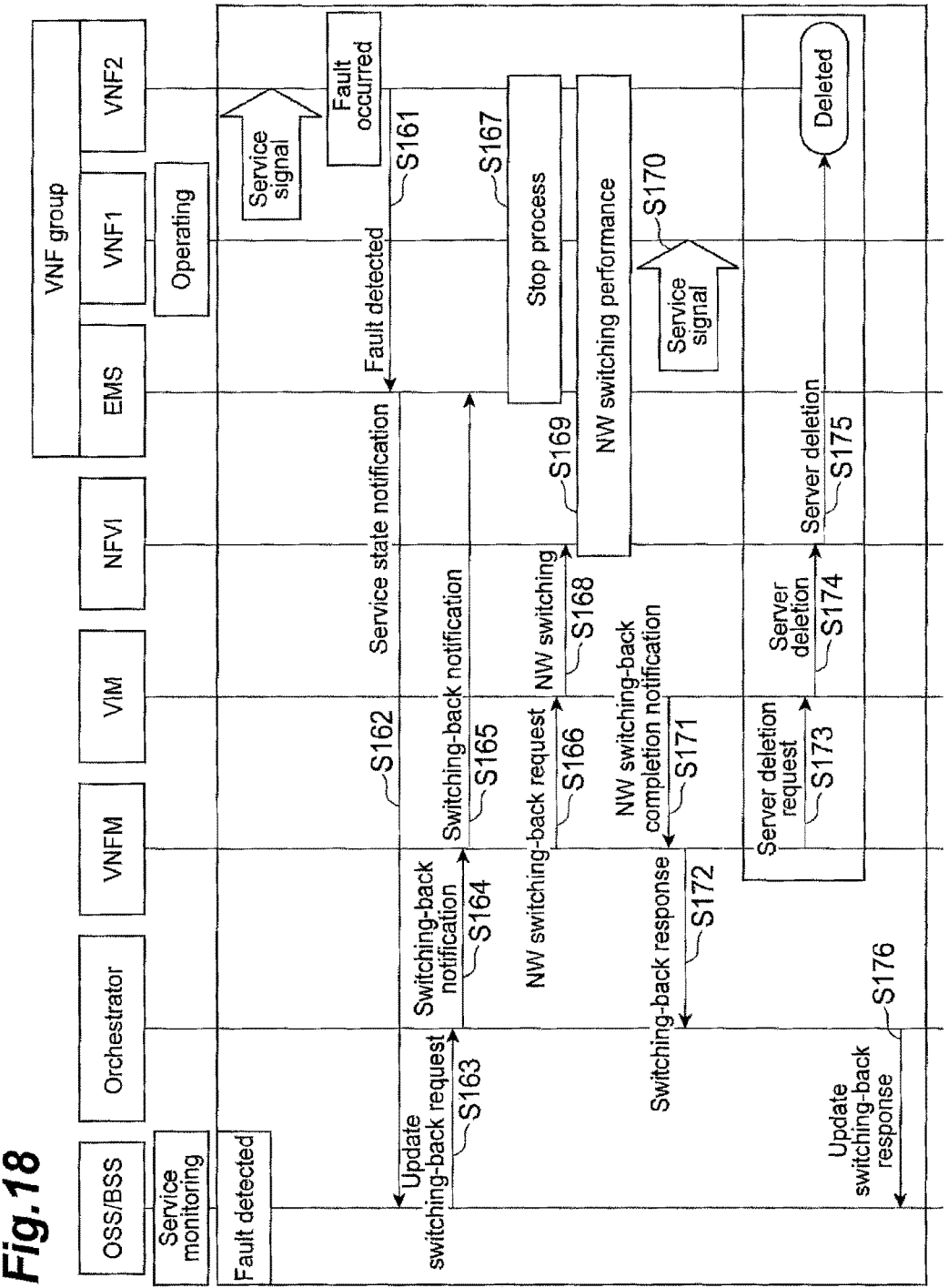
FIG. 18 is a process flow diagram at the time of abnormality occurrence (at the time of fault detected) in a new version VNF in the second embodiment.

Hereinafter, processing content in the second embodiment will be described with reference to FIGS. 15 to 18. A processing flow until generation of a new version VNF is illustrated in FIG. 15, a process flow regarding setting synchronization and network switching is illustrated in FIG. 16, a processing flow at the time of a normal operation of a new version VNF (at the time of no fault detected) is illustrated in FIG. 17, and a process flow at the time of occurrence of abnormality in the new version VNF (at the time of fault detected) is illustrated in FIG. 18. The processing flows will be described in an order below. A detailed method for network switching (FIGS. 12 and 13) is the same as in the first embodiment, and thus description thereof is omitted hereinafter.

(FIG. 15: Processing Flow Until Generation of the New Version VNF)

The OSS/BSS specifies a VNF within a target service and requests the orchestrator to perform update in order to apply a previously generated VNF to the new version (step S101). A correspondence of a target service, a VNF type, and a current version is held in the OSS/BSS in advance or at the time of the VNF generation. A signal transmitted in this case is an update request signal including (a communication service, the VNF type, and version information). (communication service: communication service 1, VNF type: VNF10, and version: 1.5) is illustrated as a setting example.

The orchestrator performs a reception response to the update request (step S102), and then inquires of the VNFM about resource information necessary for a designated version of an update target VNF (step S103). A signal transmitted in this case is a necessary resource inquiry signal including (event number, candidate resources, VNF type, and version), and in this case, a list of VIMs or the like is set in the "candidate resources".

The VNFM performs selection from the candidate resources and responds with the necessary resource information for each DC (step S104). A signal transmitted in this case is a necessary resource inquiry response signal including (event number and necessary resource information). (Event number: number specified in the query, and necessary resource information: resource information (CPU, the number of VMs, and network bandwidth) assigned to each DC) are illustrated as a setting example.

The orchestrator performs resource reservation based on the necessary resource information (step S105). A signal transmitted in this case is a resource reservation request signal including (DC and necessary resource information).

The VIM performs reservation using reservation request information and resource information under management (step S106). The VIM responds with reservation completion (step S107). A signal transmitted in this case is a resource reservation response signal including a reservation number.

When the reservation is completed, the orchestrator requests the VNFM to perform update start (step S108). A signal transmitted in this case is an update start request signal including (event number, version information, and reservation number), and (event number: number used in necessary resource inquiry, version information: 1.5, and reservation number: completed reservation number) are illustrated as a setting example.

The VNFM issues an ID (new VNF number (for example, VNF100_2)) for the new version of the VNF, and generates and holds a record (that is, old and new correspondence data in FIG. 5(*b*)) of the old and new correspondence table. The VNFM notifies the EMS performing setting management of the VNF of update start in order to synchronize the setting information to the VNF that has started up at the new version (step S109). A signal transmitted in this case is an update start notification signal including (old VNF number: VIN 100_1, new VNF number: VNF100_2, and update version).

When the EMS receives the notification from the VNFM, the EMS responds with an ACK signal (step S110). In this case, the EMS generates and holds a record (that is, old and new correspondence data in FIG. 6(*a*)) of the old and new correspondence table based on the information within the signal from the VNFM.

The VNFM receives a response from the EMS and requests the VIM to generate the VNF (step S111). A signal transmitted in this case is a VNF generation request signal including (reservation number, arrangement and startup information, and network configuration information (bandwidth, configuration, and network connection state)). Since the VNF generation request signal in this case is the same as in the first embodiment, repeated description will be omitted.

The VIM receives the VNF generation request and performs server generation and startup with respect to the NFVI (step S112). After the server generation and startup are performed, the VIM sends a notification of the VNF generation response (step S113). A signal transmitted in this case is a VNF generation response signal including (reservation number, success or fault, and server identification number), and (reservation number: reservation number at the time of generation, success or fault: startup success and fault, and server identification number: identifier VNFC100_2 of the virtual server that has started up) is illustrated as a setting example.

Accordingly, the NFVI starts up the VNF (a new version of VNF) through the server generation and startup in step S112 (step S114). If there are a plurality of servers, the server is repeatedly generated.

The VNFM having received the VNF generation response responds to the orchestrator with an ACK signal of the update start request response (step S115). In this case, the orchestrator is notified of information necessary for the old and new correspondence data generation such as the old VNF number, the new VNF number, and the update version, and the orchestrator generates and holds the record (that is, the old and new correspondence data in FIG. 4(a)) of the old and new correspondence table based on the information.

(FIG. 16: Process Flow Regarding Setting Synchronization and Network Switching)

In the VNF2, booting of the server is executed and the application is started up (step S116).

After the application starts up, the EMS specifies the new version of the VNF (VNF2) and the old version of the VNF (VNF1) by referring to the held old and new correspondence table, and performs synchronization with setting information of the old version of VNF1on the VNF while communicating with the VNF1and the VNF12(step S117).

When synchronization is completed, the EMS notifies the VNFM and the OSS/BSS of startup completion (steps S118 and S119). A signal transmitted in this case is a startup and setting completion signal including the VNF number. As a setting example, (VNF number: VNF10_2) is illustrated. However, at this time, the VNF1 still processes a signal regarding a service (step S120).

After the new VNF confirms startup and setting completion, the OSS/BSS requests the orchestrator to perform network switching (step S121). A signal transmitted in this case is a network switching request signal including (receipt number, VNF type, and switching source VNF number). As a setting example, (receipt number: a receipt number issued at the time of an update request, VNF type: update target VNF type (VNF10), and switching source VNF number: switching target VNF number (VNF10_1)) is illustrated.

The orchestrator receives the switching request, confirms the old and new correspondence table using a switching source VNF number (old VNF number) as a key to specify the number of the switching target VNF (a new VNF number), and requests switching to the VNFM (step S122). A signal transmitted in this case is a network switching request signal including (event number, and VNF number: VNF100_1).

The VNFM requests the VIM to perform network switching (step S123). A signal transmitted in this case is a network switching instruction signal including (reservation number, VNF number, and network configuration information), and (reservation number: a number at the time of resource reservation, VNF number: server identification number of switching target, network configuration information: configuration NIC_2, IP address, and ON (connection to the distributor)) is illustrated as a setting example.

The VIM performs network switching on the NFVI in response to the network switching instruction (step S124).

The NFVI performs network switching (step S125), and accordingly, a signal regarding the service is transmitted to the VNF2. Specifically, for the switching of the network, the same IP address is assigned to server 1 and server 2, and a transmission destination NIC (virtual port) for the same assigned IP packet is changed using a mechanism for changing a destination based on a flow (defined in a combination of some fields within an IP packet and an Ether frame) as in OpenFlow to thereby realize the network switching. Accordingly, a signal relating to the service is transmitted to server 2 (step S126), and execution of the process in server 2 is started.

The VIM transmits a network switching completion notification to the VNFM (step S127), the VNFM transmits a network switching response to the orchestrator (step S128), and the orchestrator transmits a network switching response to the OSS/BSS (step S129).

The EMS monitors a service in the new version VNF2 (step S130), and notifies the OSS/BSS of a state (for example, the number of times of the processing success or fault) of the service in the VNF2 (step S131). Of course, the state (for example, the number of times of the processing success or fault) that is notified of is different according to the service.

The OSS/BSS monitors the notification of the state of the service, and performs service monitoring to determine whether there is no fault for a certain period of time (step S132).

(FIG. 17: Processing Flow at the Time of Normal Operation of a New Version VNF (at the Time of No Fault Detected))

A Process when a Determined Service Monitoring Period Expires and fault is not detected is as follows.

The OSS/BSS transmits an update settlement request to the orchestrator (step S141). As a transmission trigger, a person decides or automatic transmission is performed after a certain period of time elapses. A signal transmitted in this case is an update settlement request signal including a receipt number, and (receipt number: receipt number issued at the time of update request) is illustrated as a setting example.

The orchestrator notifies the VNFM of the update settlement notification including (event number and VNF type) (step S142).

The VNFM acquires the VNF number of the old version VNF (VNF1) to be deleted by referring to the held old and new correspondence table using the VNF number of the new version VNF as a key, and notifies the EMS of the update settlement notification (step S143), and transmits a request for deletion of the old VNF to the VIM (step S144). As the update settlement notification in this case, an update settlement notification signal including (VNF type: VNF100 and VNF number: VNF100_1) is transmitted. Further, a VNF deletion request signal including (reservation number and VNF number: VNF100_1) is transmitted as the deletion request, and (reservation number: reservation number when the old VNF is generated) is illustrated as a setting example.

The EMS receives the update settlement notification and performs a process of stopping the old VNF application (step S145). At the time of the stop process, retraction of a log of the old VNF, or the like may also be included.

The VIM receives the deletion request and performs server stop and deletion on the NFVI (step S146), responds to the VNFM with an execution result (step S148), and releases the resources. A signal transmitted in this case is a VNF deletion response signal including the reservation number. Accordingly, the VNF1is extinguished through the deletion performance in step S147.

The VNFM receives the deletion response and notifies the orchestrator of the update settlement response (step S149), and the orchestrator receives the update settlement response and notifies the OSS/BSS of the update settlement response (step S150).

(FIG. 18: Processing Flow at the Time of Occurrence of Abnormality in the New Version VNF (at the Time of Fault Detected))

When a fault is generated on the new VNF (VNF2), the EMS detects the fault (step S161) and the EMS notifies the OSS/BSS that there is an abnormality in the service process (step S162).

The OSS/BSS requests the entire management to perform an update switching-back request for return to before the update (step S163). A signal transmitted in this case is an update switching-back request signal including (receipt number and deletion necessity).

The orchestrator receives the update switching-back request, and transmits a switching-back notification to the VNFM (step S164).

The VNFM receives the update switching-back notification, recognizes a correspondence relationship between old and new versions of VNFs by referring to the held old and new correspondence table, acquires a VNF number of the new version VNF (VNF2), and transmits a switching-back notification to the EMS (step S165). A signal transmitted in this case is a switching-back notification signal including (VNF number: VNF100_2). Further, the VNFM transmits a network switching-back request to the VIM (step S166). As a signal transmitted in this case, a network switching-back request signal including a reservation number with which the new VNF is reserved is transmitted.

The EMS managing the VNF stops the application of the VNF2 (step S167).

The VIM instructs the NFVI to perform network switching (step S168), and transmits a network switching-back response to the VNFM (step S171).

The NFVI performs network switching (step S169). Accordingly, a service-related signal is transmitted to the VNF1(step S170).

The VNFM receives the network switching-back response from the VIM and notifies the orchestrator of the update switching-back response (step S172), and the orchestrator notifies the OSS/BSS of an update switching-back response (step S176). In this case, the VNFM performs a server deletion process according to a deletion necessity in the switching-back request. That is, the VNFM transmits the server deletion request to the VIM (step S173), the VIM instructs the NFVI to perform the server deletion (step S174), and the NFVI deletes the server (VNF2) (step S175).

Further, the old and new correspondence data (the record within the old and new correspondence table) held by the orchestrator and the VNFM is deleted at the time of update settlement or network switching-back. The old and new correspondence data (the record within the old and new correspondence table) held by the EMS is deleted at the time of deletion of the new VNF or the old VNF.

[State Transition of Update]

Figure 19:
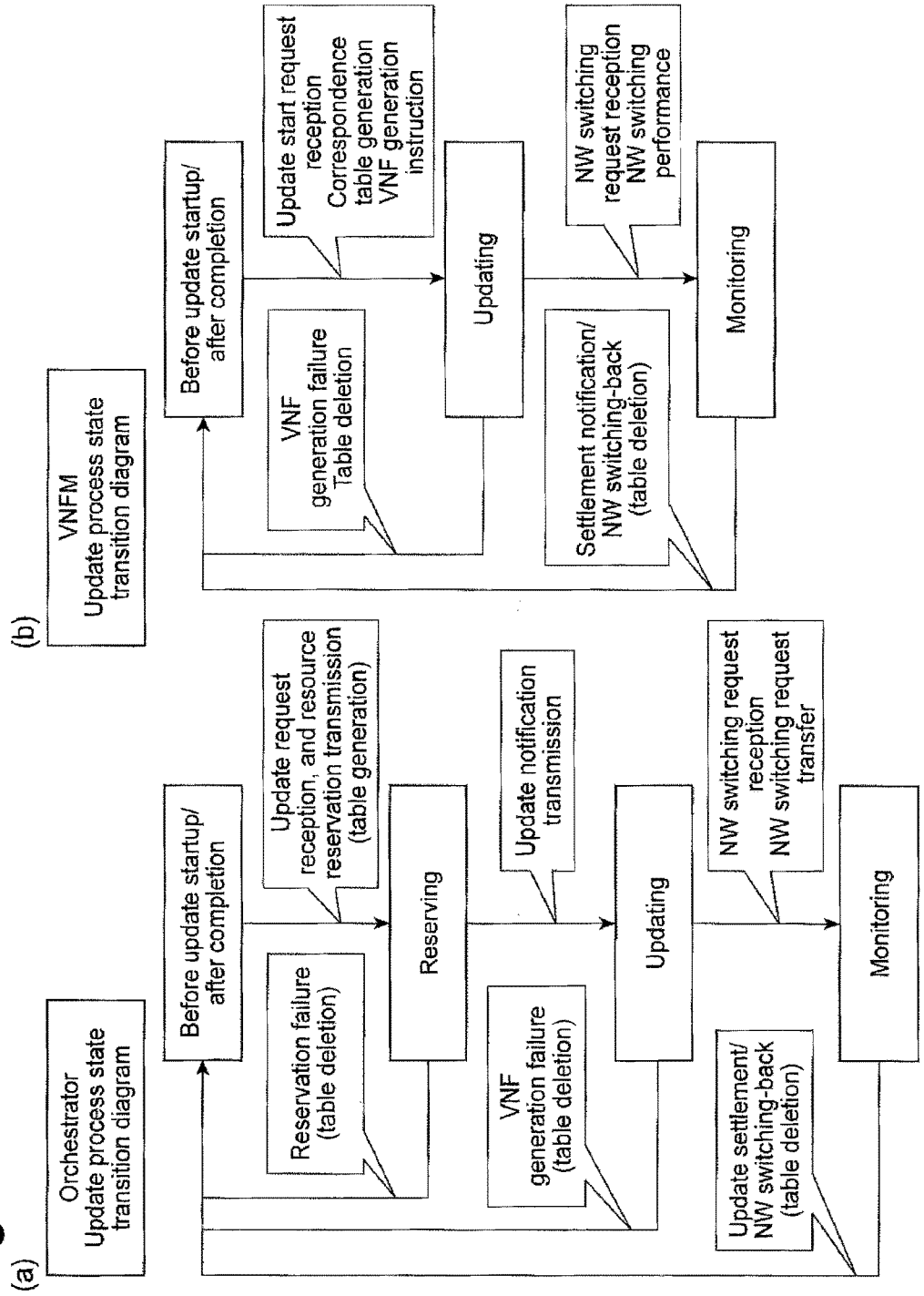
FIGS. 19(*a*) and 19(*b*) are diagrams illustrating a state transition of update in the second embodiment, FIG. 19(*a*) illustrates a state transition of update in an orchestrator, and FIG. 19(*b*) illustrates a state transition of update in a VNFM.

Here, a state transition of update of each of the orchestrator 20 and the VNFM 30 in the second embodiment will be described with reference to FIG. 19. A "table" described in FIG. 19 means one record of the old and new correspondence data.

As illustrated in FIG. 19(a), a "state of update" of the orchestrator 20 transitions from an initial state (before update startup/after completion) to "reserving" when the orchestrator 20 receives an update request, transmits resource reservation, and generates a table associated with this update. Here, if the reservation fails and the above table is deleted, the state of the update returns to an initial state.

Then, when the orchestrator 20 transmits an update notification, the state of the update transitions from "reserving" to "updating". Here, if the VNF generation fails and the above table is deleted, the state of the update returns to an initial state.

Further, when the orchestrator 20 receives the network switching request and transfers the network switching request, the state of the update transitions from "updating" to "monitoring". Then, if the update is settled or the network is switched back and the table is deleted, the state of the update returns to an initial state.

As illustrated in FIG. 19(b), the "state of update" of the VNFM 30 transitions from an initial state (before update startup/after completion) to "updating" when the VNFM 30 receives the update start request to instruct to generate the VNF, and generates a table related to current update. Here, if the VNF generation fails and the above table is deleted, the state of the update returns to the initial state.

Next, when the VNFM 30 receives the network switching request and performs the network switching, the state of the update transitions from "updating" to "monitoring". Then, if the update is settled or the network is switched back and the table is deleted, the state of the update returns to an initial state.

In the second embodiment described above, it is possible to efficiently execute update-related work including a process for update into the new version and recovery to the old version in a unified process procedure regardless of a type of application, similar to the first embodiment. That is, it is possible to realize efficient and seamless update-related work.

REFERENCE SIGNS LIST

1: update management system; 20: orchestrator; 21: data holder; 22: resource information acquirer; 23: resource reserver; 24: VNF generation instructor; 25: switching instructor; 26: switching-back requestor; 30: VNFM; 31: data holder; 32 and 32A: VNF startup notifier; 33: VNF generation instructor; 34: switching instructor; 35: switching-back requestor; 40: VIM; 41: VNF generates; 42: switcher; 43: switching-back executor; 50: OSS/BSS; 60: NFVI; 61: virtual network; 61A: virtual switch; 62A and 62B: virtual hardware; 63: distributor; 64A and 64B: virtual interface; 80: EMS; 81: data holder; 82: synchronizer; 83: monitor; 101: CPU; 102: RAM; 103: ROM; 104: communication module; 105: auxiliary storage device.

The invention claimed is:
1. An update management system, comprising:
service monitor circuitry configured to monitor a communication service executed by a virtual server; and
virtual communication function management circuitry configured to generate old and new correspondence data indicating correspondence between a new version virtual server and an old version virtual server; and instruct virtualization resource management circuitry
to generate the new version virtual server based on the old and new correspondence data;
to update and switch from the old version virtual server to the generated new version virtual server, that corresponds to the old version virtual server; and
notify the service monitor circuitry that there is startup of the new version virtual server based on the old and new correspondence data, wherein the virtualization resource management circuitry is configured to
manage each of virtualization resources including a physical server in which the virtual server executing the communication service is generated;
generate the new version virtual server; and
update and switch from the old version virtual server to the generated new version virtual server, the virtualization resource management circuitry is configured to update the old version virtual server to the new version virtual server by:
initially connecting the new version virtual server to the network without disconnecting the old version virtual server from the network, and
disconnecting, the old version virtual server from the network when there is no process continued from before switching or when a predetermined new-version monitoring period expires, and the update management system further includes distributor circuitry configured to distribute a destination of a packet from outside in the update management system, wherein after the new version virtual server is initially connected to the network without disconnecting the old version virtual server from the network, the distributor circuitry is configured to distribute the destination of the packet from outside in the update management system to the new version virtual server in an order from a newly starting process.

2. The update management system according to claim 1, wherein the service monitor circuitry performs synchronization to setting information of the old version virtual server on the new version virtual server, based on the old and new correspondence data that is obtained based on the notification from the virtual communication function management circuitry, the virtual communication function management circuitry instructs the virtualization resource management circuitry to update the old version virtual server to the new version virtual server after completion of the synchronization, and the virtualization resource management circuitry updates the old version virtual server to the new version virtual server based on the instruction.

3. The update management system according to claim 1, wherein when there is an abnormality in a new version communication service executed by the new version virtual server through monitoring by the service monitor circuitry, the virtual communication function management circuitry identifies the new version virtual server and the old version virtual server based on the old and new correspondence data and requests the virtualization resource management circuitry to execute network switching-back from the new version virtual server to the old version virtual server, and the virtualization resource management circuitry executes the network switching-back from the new version virtual server to the old version virtual server based on a request for the network switching-back.

4. The update management system according to claim 1, further comprising orchestrator circuitry configured to:
perform entire management of the virtualization resources;
receive a request for update into a new version of a communication service application;
acquire resource information for the new version virtual server from the virtual communication function management circuitry;
reserve resources for the new version virtual server with respect to the virtualization resource management circuitry; and
transmit reserved resource information and an instruction for update into the new version to the virtual communication function management circuitry, and
the virtual communication function management circuitry instructs the virtualization resource management circuitry to update to the new version virtual server using the reserved resources.

5. The update management system according to claim 4, wherein the service monitor circuitry performs synchronization to setting information of the old version virtual server on the new version virtual server, based on the old and new correspondence data that is obtained based on the notification from the virtual communication function management circuitry, and the orchestrator circuitry instructs the virtualization resource management circuitry to update from the old version virtual server to the new version virtual server after completion of the synchronization.

6. The update management system according to claim 5, wherein when there is an abnormality in a new version communication service executed by the new version virtual server through monitoring by the service monitor circuitry, the orchestrator circuitry identifies the new version virtual server and the old version virtual server based on the old and new correspondence data and requests the virtualization resource management circuitry to execute network switching-back from the new version virtual server to the old version virtual server.

7. An update management method that is executed in an update management system including virtualization resource management circuitry configured to manage each of virtualization resources including a physical server in which a virtual server executing a communication service is generated, a service monitor circuitry configured to monitor the communication service executed by the virtual server, and a virtual communication function management circuitry configured to manage the virtual server, the update management method comprising:
at the virtual communication function management circuitry,
generating old and new correspondence data indicating correspondence between a new version virtual server and an old version virtual server; and
instructing the virtualization resource management circuitry to generate the new version virtual server based on the old and new correspondence data;
to update and switch from the old version virtual server to the generated new version virtual server, that corresponds to the old version virtual server; and
to notify the service monitor circuitry that there is startup of the new version virtual server based on the old and new correspondence data;

at the virtualization resource management circuitry,
managing each of virtualization resources including a physical server in which the virtual server executing the communication service is generated;
generating the new version virtual server; and
updating and switching from the old version virtual server to the generated new version virtual server, the method further including, at the virtualization resource management circuitry, updating the old version virtual server to the new version virtual server by:
initially connecting the new version virtual server to the network without disconnecting the old version virtual server from the network, and
disconnecting the old version virtual server from the network when there is no process continued from before switching or when a predetermined new-version monitoring period expires, wherein the updating the old version virtual server to the new version virtual server includes:
after initially connecting the new version virtual server to the network without disconnecting the old version virtual server from the network, distributing, using distributor circuitry configured to distribute a destination of a packet from outside in the update management system, the destination of the packet to the new version virtual server in an order from a newly starting process.

8. The update management system according to claim 1, wherein the old and new correspondence data includes at least one of a receipt number, a new virtual network function (VNF) number, an old VNF number, a VNF type, a version, a network configuration, and a state.

* * * * *